(12) United States Patent
Takae et al.

(10) Patent No.: US 10,522,041 B2
(45) Date of Patent: Dec. 31, 2019

(54) DISPLAY DEVICE CONTROL METHOD AND DISPLAY DEVICE

(71) Applicant: Nissan Motor Co., Ltd., Yokohama-shi, Kanagawa (JP)

(72) Inventors: Yasuhiko Takae, Kanagawa (JP); Nariaki Etori, Kanagawa (JP); Akira Morimoto, Kanagawa (JP); Takahiro Yano, Kanagawa (JP); Tatsuya Shino, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/069,567

(22) PCT Filed: Nov. 25, 2016

(86) PCT No.: PCT/JP2016/085047
§ 371 (c)(1),
(2) Date: Jul. 12, 2018

(87) PCT Pub. No.: WO2017/126221
PCT Pub. Date: Jul. 27, 2017

(65) Prior Publication Data
US 2019/0027039 A1 Jan. 24, 2019

(30) Foreign Application Priority Data
Jan. 19, 2016 (JP) .................. 2016-007580

(51) Int. Cl.
*G08G 1/16* (2006.01)
*B60K 35/00* (2006.01)
(Continued)

(52) U.S. Cl.
CPC ............. *G08G 1/166* (2013.01); *B60K 35/00* (2013.01); *G06F 3/0481* (2013.01);
(Continued)

(58) Field of Classification Search
CPC ...... G01G 1/00; G01G 1/0112; G01G 1/0133; G01G 1/015; G01G 1/09; G01G 1/0962;
(Continued)

(56) References Cited

U.S. PATENT DOCUMENTS 6,249,720 B1 6/2001 Kubota et al.
2009/0219405 A1* 9/2009 Kaneda .................. H04N 5/232
348/222.1
(Continued)

FOREIGN PATENT DOCUMENTS

EP 2639781 A1 9/2013
JP H1137766 A 2/1999
(Continued)

OTHER PUBLICATIONS

Nakada, M. (2002). Vision driven Biomechanical Human Control. Retrieved Mar. 2, 2019, from http://web.cs.ucla.edu/~nakada/page1/page2/index.html (Year: 2002).*

*Primary Examiner* — Robert T Nguyen
(74) *Attorney, Agent, or Firm* — Young Basile Hanlon & MacFarlane, P.C.

(57) ABSTRACT

A display control method includes displaying the detection state of a detector on a display device using an agent displayed on the display device. The detector detects a surrounding object. This method further includes determining the detection state of the detector on the basis of the detection result of the detector and setting the facial expression of the agent on the basis of the detection state of the detector.

12 Claims, 18 Drawing Sheets

(51) Int. Cl.
  *G06F 3/0481* (2013.01)
  *G06K 9/00* (2006.01)
  *G08G 1/0962* (2006.01)
  *H04N 7/18* (2006.01)

(52) U.S. Cl.
  CPC ....... *G06K 9/00805* (2013.01); *G08G 1/0962* (2013.01); *H04N 7/18* (2013.01)

(58) Field of Classification Search
  CPC .......... G01G 1/16; G01G 1/161; G01G 1/163; G01G 1/165; G01G 1/166; B60W 50/14; B60W 2050/146; B60W 2420/42; B60W 2550/10; B60W 2550/22; G06F 3/0481; B60K 35/00; G06K 9/00805; H04N 7/18
  See application file for complete search history.

(56) References Cited

U.S. PATENT DOCUMENTS

| | | | |
|---|---|---|---|
| 2013/0335569 A1 | 12/2013 | Einecke et al. | |
| 2014/0003034 A1* | 1/2014 | Lien | F21V 23/003 |
| | | | 362/98 |
| 2014/0176350 A1 | 6/2014 | Niehsen et al. | |
| 2014/0226015 A1 | 8/2014 | Takatsudo et al. | |
| 2016/0049094 A1* | 2/2016 | Gupta | G09B 19/04 |
| | | | 434/185 |
| 2017/0025005 A1 | 1/2017 | Barth et al. | |
| 2017/0113686 A1 | 4/2017 | Horita et al. | |

FOREIGN PATENT DOCUMENTS

| | | | |
|---|---|---|---|
| JP | 2000267039 A | | 9/2000 |
| JP | 2002046501 A | | 2/2002 |
| JP | 2003291688 A | | 10/2003 |
| JP | 2006284454 A | | 10/2006 |
| JP | 2006315489 A | | 11/2006 |
| JP | 2009265330 A | * | 11/2009 |
| JP | 2009265330 A | | 11/2009 |
| JP | 2010127779 A | | 6/2010 |
| JP | 2010173342 A | | 8/2010 |
| JP | 201273926 A | | 4/2012 |
| JP | 4952421 B2 | | 6/2012 |
| JP | 5616531 B2 | | 10/2014 |
| JP | 2015199439 A | | 11/2015 |
| WO | 2015135621 A1 | | 9/2015 |

* cited by examiner

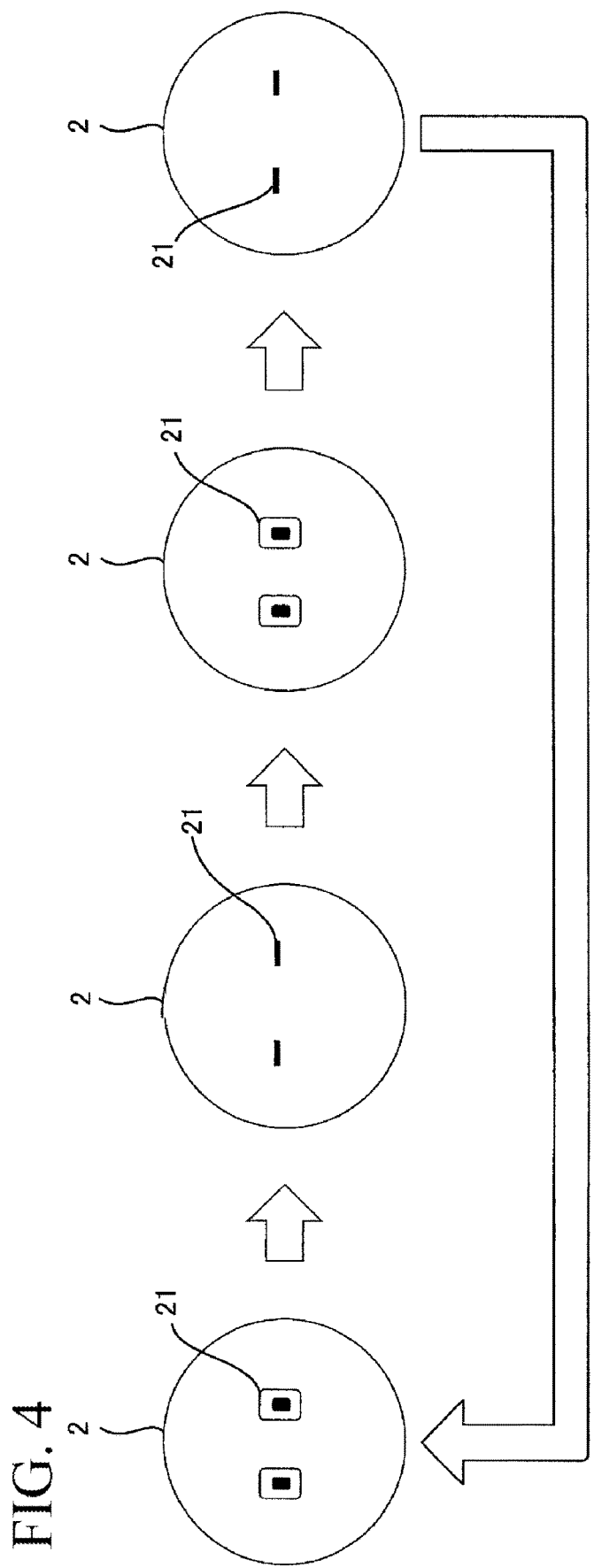

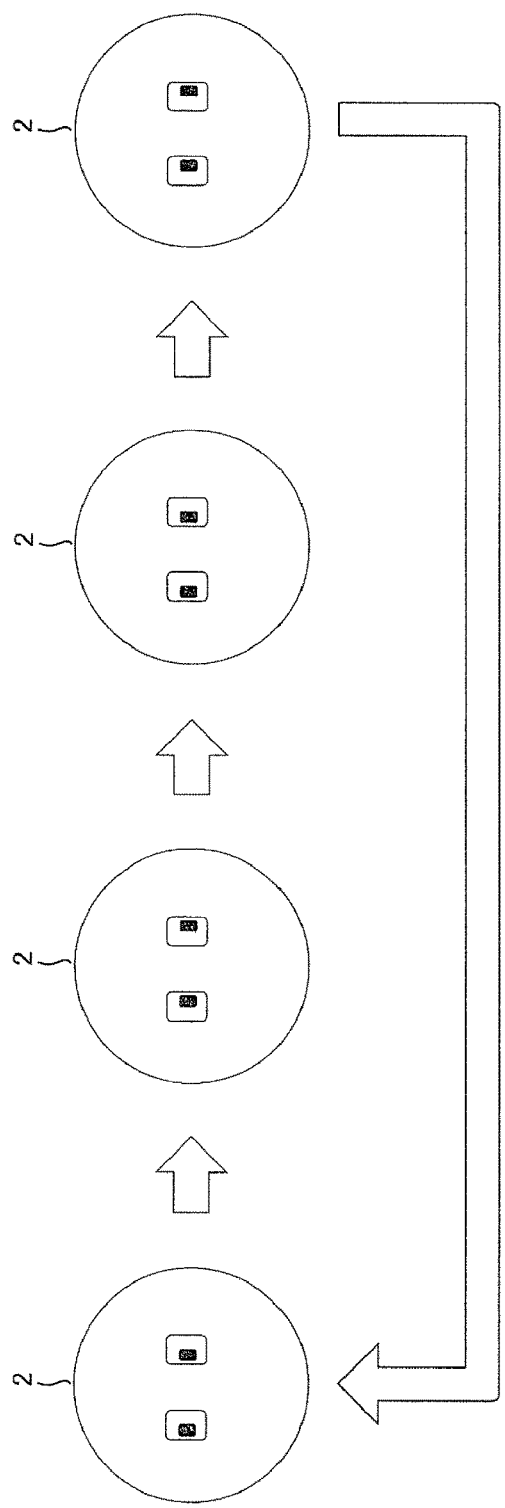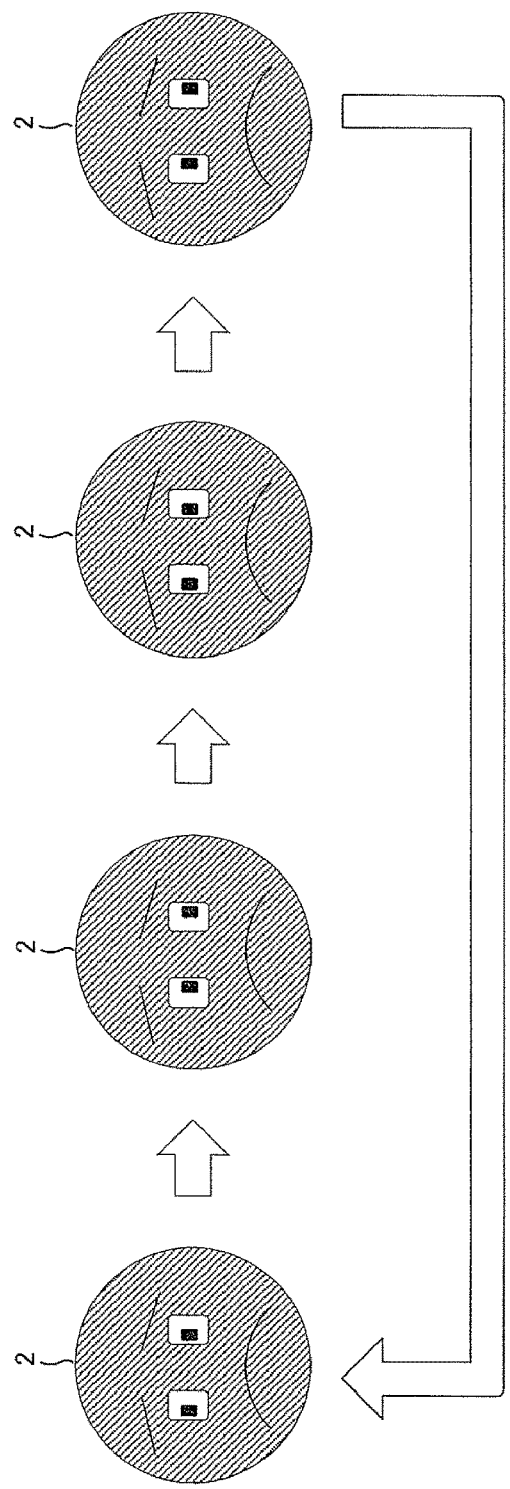
FIG. 14A
FIG. 14B

DISPLAY DEVICE CONTROL METHOD AND DISPLAY DEVICE

CROSS-REFERENCE TO RELATED APPLICATIONS

The present application is based on Japanese Patent Application No. 2016-007580 filed Jan. 19, 2016, the entire content of which is herein incorporated by reference.

TECHNICAL FIELD

The present invention relates to a method of controlling a display device and relates also to a display device.

BACKGROUND

Known in the art is a technique of visually displaying the detection sensitivity of an onboard camera to the user (e.g. Japanese Patent Application JP2012-73926A).

According to Japanese Patent Application JP2012-73926A, the driver may be allowed to perceive whether the detection sensitivity of the onboard camera is good or bad. However, Japanese Patent Application JP2012-73926A cannot allow the driver to intuitively perceive the detection state of the onboard camera, such as whether the onboard camera is in a state of searching for an object or in a state of detecting an object.

SUMMARY

A problem to be solved by the present invention is to provide a method of controlling a display device and a display device that allow the driver to intuitively perceive the detection state of an ambient detection sensor.

The present invention solves the above problem through determining the detection state of a detector on the basis of a detection result of the detector, setting a display form of an eye of a facial expression of an image imitating a face including at least the eye on the basis of the detection state of the detector, and displaying the image imitating a face on a display device.

According to the present invention, the detection state of an ambient detection sensor can be expressed using the display form of an eye of the facial expression of the image imitated a face including at least the eye and therefore intuitively perceived by the driver.

BRIEF DESCRIPTION OF THE DRAWINGS

FIG. 4 is a diagram illustrating an example of the facial expression of an agent searching for an object in one or more embodiments of the present invention;

FIGS. 14A and 14B are a set of diagrams each illustrating an example of the facial expression of an agent when an implicitness determination value is high in one or more embodiments of the present invention;

DETAILED DESCRIPTION

Hereinafter, one or more embodiments of the present invention will be described with reference to the drawings. In the embodiments, exemplary cases will be described in which the method of controlling a display device and the display device of the present invention are applied to an automated driving apparatus 1 equipped in a vehicle.

First Embodiment

Figure 1:
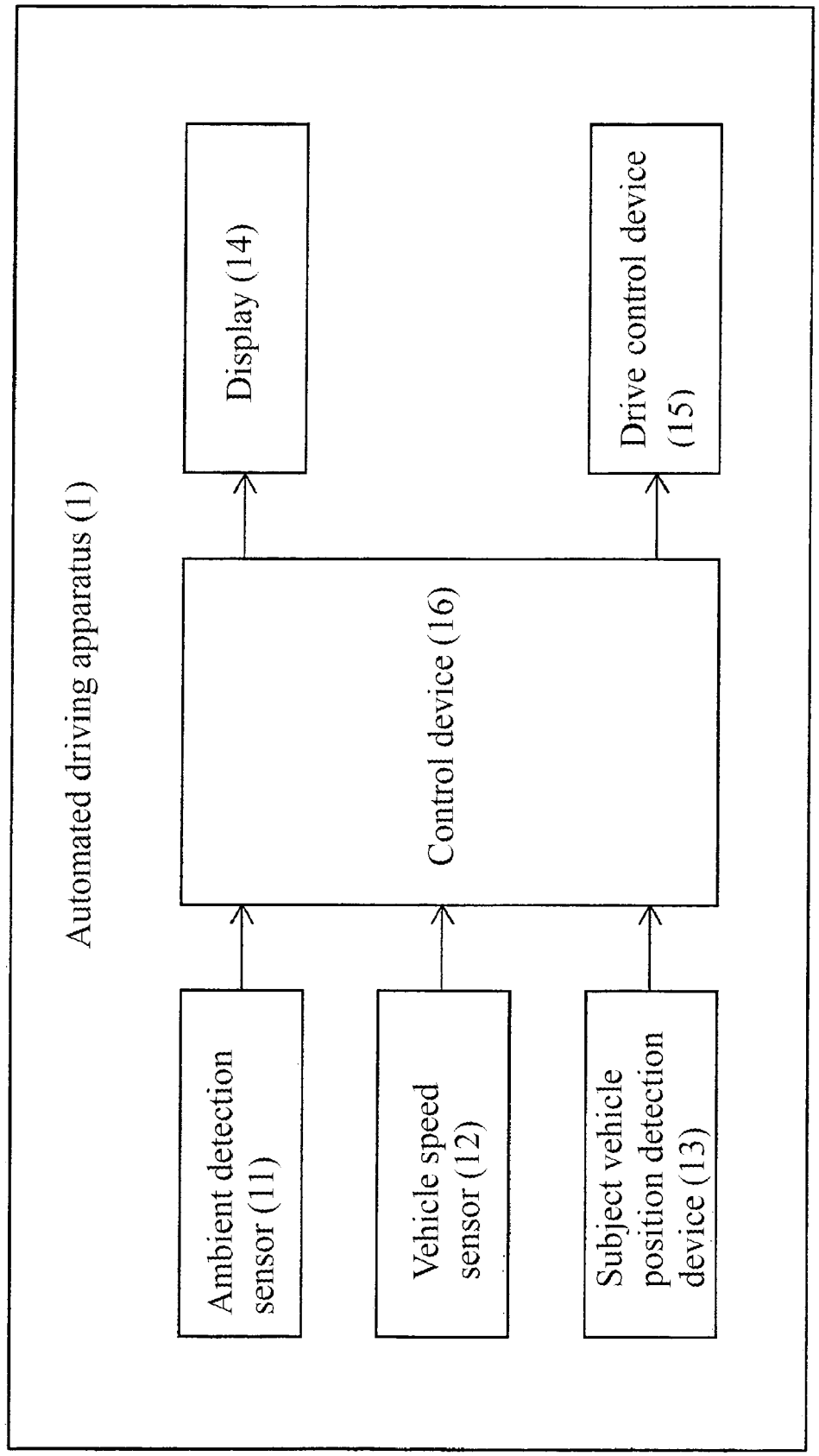
FIG. 1 is a block diagram illustrating the configuration of an automated driving apparatus according to one or more embodiments of the present invention.

FIG. 1 is a block diagram illustrating the configuration of the automated driving apparatus 1 according to a first embodiment of the present invention. As illustrated in FIG. 1, the automated driving apparatus 1 according to the present embodiment includes an ambient detection sensor 11, a vehicle speed sensor 12, a subject vehicle position detection device 13, a display 14, a drive control device 15, and a control device 16. These devices are connected to one another via a controller area network (CAN) or other in-vehicle LAN for mutually exchanging information.

The ambient detection sensor 11 detects an object 3 existing around the subject vehicle. Examples of such an ambient detection sensor 11 include a front camera that captures images ahead of the subject vehicle, a rear camera that captures images behind the subject vehicle, a front radar that detects obstacles ahead of the subject vehicle, a rear radar that detects obstacles behind the subject vehicle, and side radars that detect obstacles existing on sides of the subject vehicle. Examples of the object 3 detected by the ambient detection sensor 11 include pedestrians, bicycles, motorbikes, cars, obstacles on a road, structures, traffic signals, road signs, lane marks, road edges (such as curbstones and guardrails), and road shapes (such as curves). The ambient detection sensor 11 may be configured using one of the above-described sensors or may also be configured using a combination of two or more sensors. The detection results of the ambient detection sensor 11 are output to the control device 16.

The vehicle speed sensor 12 measures the rotation speed of a drive system such as a drive shaft and detects the traveling speed of the vehicle (also referred to as a "vehicle speed," hereinafter) on the basis of the measured rotation speed. The vehicle speed information detected by the vehicle speed sensor 12 is output to the control device 16.

The subject vehicle position detection device 13 is composed of a GPS unit, a gyro-sensor, and other necessary components. The subject vehicle position detection device 13 detects radio waves transmitted from a plurality of communication satellites using the GPS unit to periodically acquire the positional information of a target vehicle (subject vehicle). Then, the subject vehicle position detection device 13 detects the current position of the target vehicle on the basis of the acquired positional information of the target vehicle, angle variation information acquired from the gyro-sensor, and the vehicle speed acquired from the vehicle speed sensor 12. The positional information of the target vehicle detected by the subject vehicle position detection device 13 is output to the control device 16.

The display 14 may be, for example, a device such as a display of the navigation device, a display incorporated in the rearview mirror, a display incorporated in the meter unit of an instrument panel, or a head-up display projected on the windshield. The display 14 displays an agent 2 in accordance with the control by the control device 16. The agent 2 will be described later.

The drive control device 15 controls travel of the subject vehicle. For example, when the subject vehicle is provided with a mode of automatically following up a preceding vehicle, the drive control device 15 controls the operation of a drive mechanism (which includes the operation of an internal-combustion engine in the case of an engine car and the operation of an electric motor in the case of an electric car and further includes the torque distribution between an internal-combustion engine and an electric motor in the case of a hybrid car) and the operation of a brake to achieve the acceleration, deceleration and vehicle speed so that the distance between the subject vehicle and the preceding vehicle can be maintained at a constant distance. When the subject vehicle is provided with a mode of performing automatic steering, such as right and left turns or lane change of the subject vehicle, the drive control device 15 controls the operation of a steering actuator to control the operation of wheels and thereby executes the turning control of the subject vehicle. The drive control device 15 controls the travel of the subject vehicle in accordance with commands from the control device 16, which will be described later. Other known methods can also be employed as a travel control method performed by the drive control device 15.

The control device 16 is composed of a read only memory (ROM) that stores programs for displaying the agent 2 (details will be described later) representing a detection state (scan state) of the ambient detection sensor 11 on the display 14, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or other appropriate component can also be used as an operation circuit.

The control device 16 executes the programs stored in the ROM using the CPU thereby to achieve the following various functions: a detection result acquisition function of acquiring the detection results of the ambient detection sensor 11; a detection state determination function of determining the detection state of the ambient detection sensor 11 on the basis of the detection results of the ambient detection sensor 11; an agent display function of displaying the agent 2 on the display 14; a facial expression setting function of setting the facial expression of the agent 2, which is to be displayed on the display 14, on the basis of the detection state of the ambient detection sensor 11; and a travel control function of controlling the automated driving travel. These functions of the control device 16 will be described below.

The control device 16 can use the detection result acquisition function to acquire the detection results from the ambient detection sensor 11. For example, the control device 16 can use the detection result acquisition function to acquire the external image information around the vehicle captured by the front camera and rear camera and/or the detection results obtained by the front radar, rear radar and side radars as the detection results of the ambient detection sensor 11.

The control device 16 can use the detection state determination function to determine the detection state (scan state) of the ambient detection sensor 11 on the basis of the detection results of the ambient detection sensor 11 acquired using the detection result acquisition function. Specifically, the control device 16 can use the detection state determination function to determine whether the detection state is a state of searching for an object 3, a state of detecting an object 3, a state of tracking an object 3, a state of losing sight of an object 3, or a state of being incapable of executing detection of an object 3, on the basis of the detection results of the ambient sensor 11. In addition, when the subject vehicle is in the state of detecting an object 3 or in the state of tracking an object 3, the control device 16 can use the detection state determination function to calculate the position of the detected object 3.

Here, the state of searching for an object 3 refers to a state in which detection of an object 3 is being executed but no object 3 is detected. The state of detecting an object 3 refers to a state in which the object 3 is newly detected. The state of detecting an object 3 continues for a certain period of time and is then followed by the state of tracking the object 3. The state of tracking an object 3 refers to a state in which the object 3 once detected is repeatedly detected at regular time intervals. The state of losing sight of an object 3 refers to a state in which the object 3 has been detected but thereafter cannot be detected. In the present embodiment, when no object 3 can be detected, the detection state is the state of losing sight of an object 3. The state of being incapable of executing detection of an object 3 refers to a state that is in an environment in which it is difficult to execute detection of an object 3 due to weather, such as fog, rain or snow, or ambient luminance, such as in the night.

Figure 2:
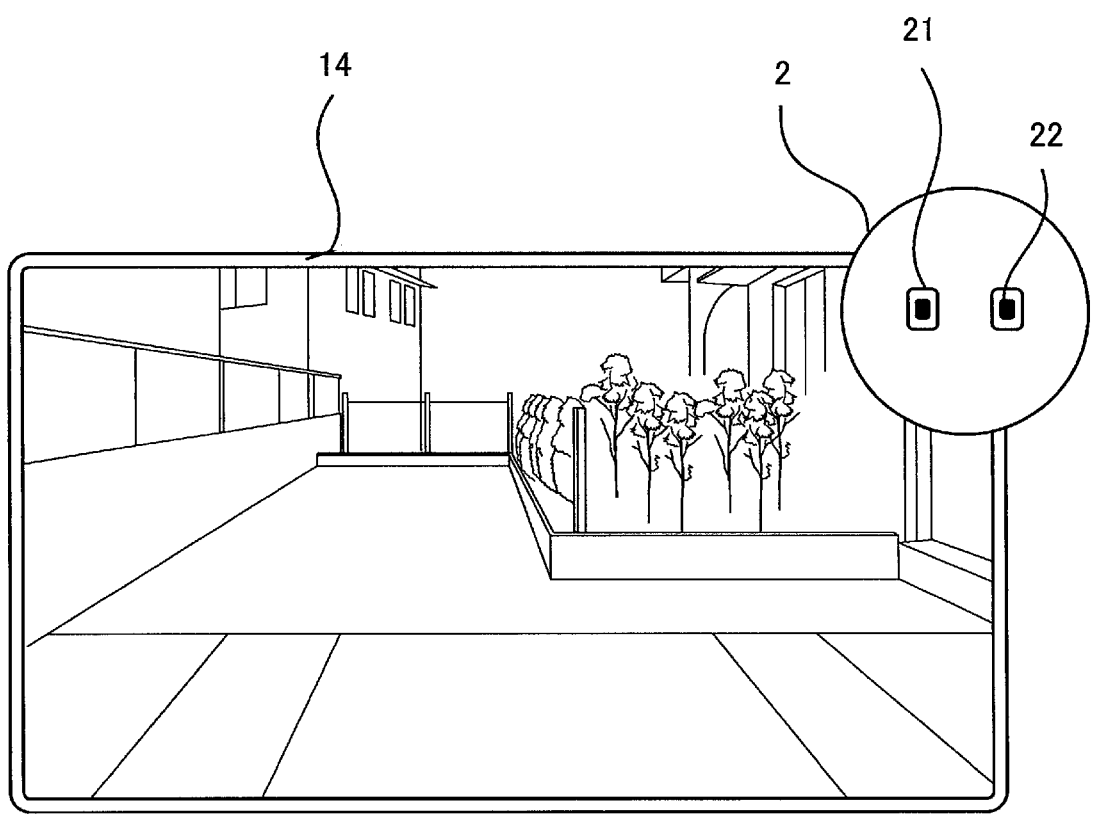
FIG. 2 is a diagram illustrating a screen example displayed on a display according to one or more embodiments of the present invention.
Figure 3A:
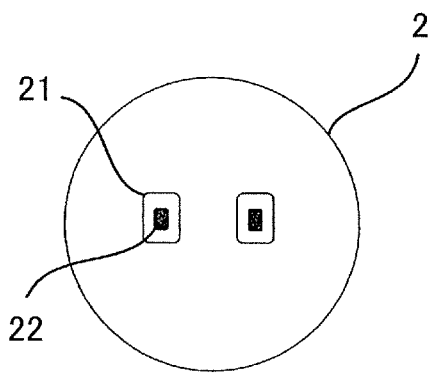
FIGS. 3A and 3B are a set of diagrams each illustrating an example of the facial expression of an agent according to one or more embodiments of the present invention.
Figure 3B:
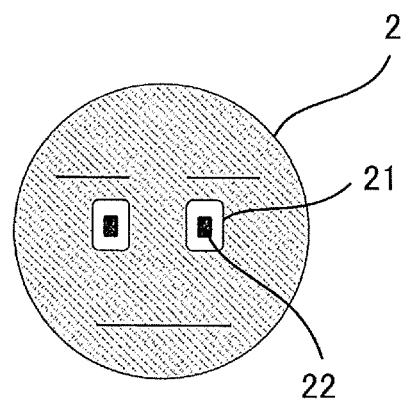

The control device 16 uses the agent display function to display an agent representing the detection state of the ambient detection sensor 11 on the screen of the display 14. The agent 2 in the present embodiment is a type of information transmission medium for indicating the detection state of the ambient detection sensor 11 to the driver. In particular, a personified character image is employed in the present embodiment so that the driver can intuitively perceive the information content that the ambient detection sensor 11 is in the detection state. FIG. 2 is a diagram illustrating a screen example displayed on the display 14 and FIGS. 3A and 3B are a set of diagrams each illustrating a display example of the agent 2. As illustrated in FIG. 2 and FIGS. 3A and 3B, for example, the personified agent 2 of the present embodiment preferably has at least portions 21 that imitate eyes (simply referred to as "eyes 21," hereinafter).

The shape or form of the personified agent 2 of the present embodiment is not particularly limited, and the agent 2 may be an image that imitates a human or a human face, for example, as illustrated in FIG. 2 and FIGS. 3A and 3B. The personified agent 2 is not limited only to an image that imitates a human or a human face and may also be an image that imitates a dog, a cat, or other animal or an animal's face. This is because, generally in animals other than humans, it is said that expressions, that is, affections and emotions in the heart are not expressed in facial expressions and gestures, but if facial expressions that resemble human facial expressions are set in images of animals other than humans, the same actions and effects as those of human images can be obtained. Examples of the agent 2 of the present embodiment therefore include those imitating animals.

The agent 2 preferably has at least sites corresponding to the eyes 21, and other sites can be appropriately set. For example, as illustrated in FIG. 3A, the agent 2 may be configured to have a facial outline. In an alternative embodiment, although not illustrated, the agent 2 may be configured to have a body in addition to the facial outline. In addition or alternatively, as illustrated in FIG. 3B, the agent 2 may be configured to have eyebrows and a mouth. In addition or alternatively, as illustrated in FIG. 3B, the color of the face may be changed on the basis of the detection state of the ambient detection sensor 11. The following description will be made on the assumption that the facial expression of the agent 2 illustrated in FIG. 3A or FIG. 3B is the facial expression in the initial state.

The control device 16 uses the facial expression setting function to set the facial expression of the agent 2. Specifically, the control device 16 can use the facial expression setting function to set the facial expression of the agent 2 on the basis of the detection state of the ambient detection sensor 11. Forms of setting the facial expression of the agent 2 based on respective detection states will be described below.

FIG. 4 is a diagram illustrating an example of display of the agent 2 when the ambient detection sensor 11 is searching for an object 3. When the ambient detection sensor 11 is searching for an object 3, the control device 16 uses the facial expression setting function to repeat a state in which the agent 2 opens the eyes 21 and a state in which the agent 2 closes the eyes 21, that is, to make the agent 2 blink the eyes, for example, as illustrated in FIG. 4, thereby setting the facial expression as if the agent 2 intentionally blinks. Since humans often blink the eyes when gazing at the surroundings, such setting of the facial expression allows the driver to intuitively perceive that the ambient detection sensor 11 is searching for an object 3 existing around the subject vehicle.

Figure 5A:
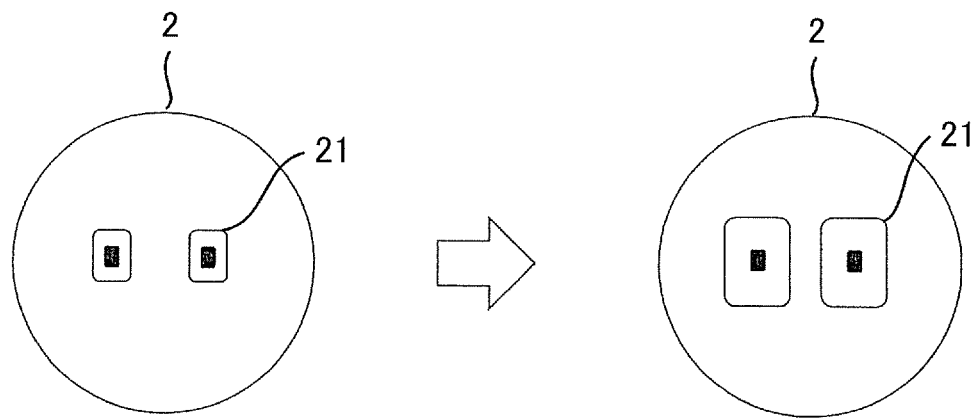
FIGS. 5A and 5B are a set of diagrams each illustrating an example of the facial expression of an agent detecting an object in one or more embodiments of the present invention.
Figure 5B:
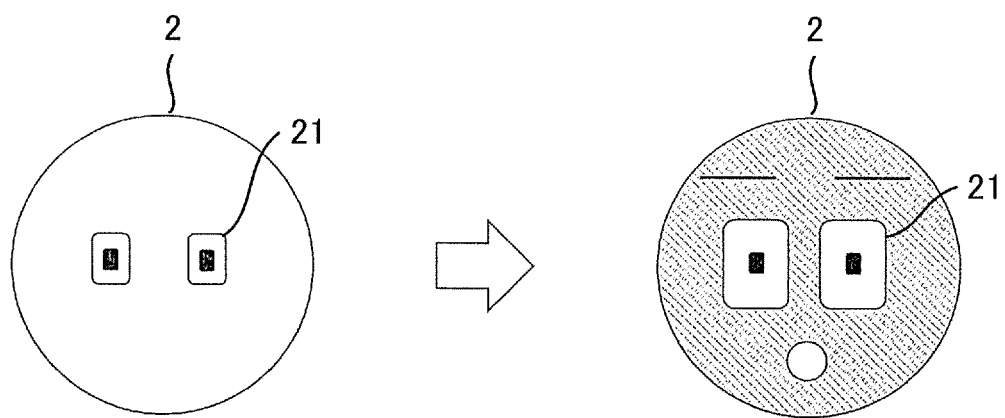

FIGS. 5A and 5B are a set of diagrams each illustrating an example of the facial expression of the agent 2 when the ambient detection sensor 11 detects an object 3. When the ambient detection sensor 11 detects an object 3, the control device 16 uses the facial expression setting function to set the facial expression, for example, as illustrated in FIG. 5A, as if the agent 2 opens the eyes 21 wide. In addition or alternatively, eyebrows and an open mouth may be added to the agent 2, for example, as illustrated in FIG. 5B, and the facial color of the agent 2 may be changed to yellow (indicated by thin diagonal lines in the example illustrated in FIG. 5B, the same applies to FIG. 6A, FIG. 10A, FIG. 11A, and FIG. 14B) for a certain period of time (e.g. several seconds). When humans notice a surrounding object 3, they often open the eyes wide to make a slightly surprised expression or change the facial color. Such setting of the facial expression therefore allows the driver to intuitively perceive that the ambient detection sensor 11 detects an object 3.

Figure 6A:
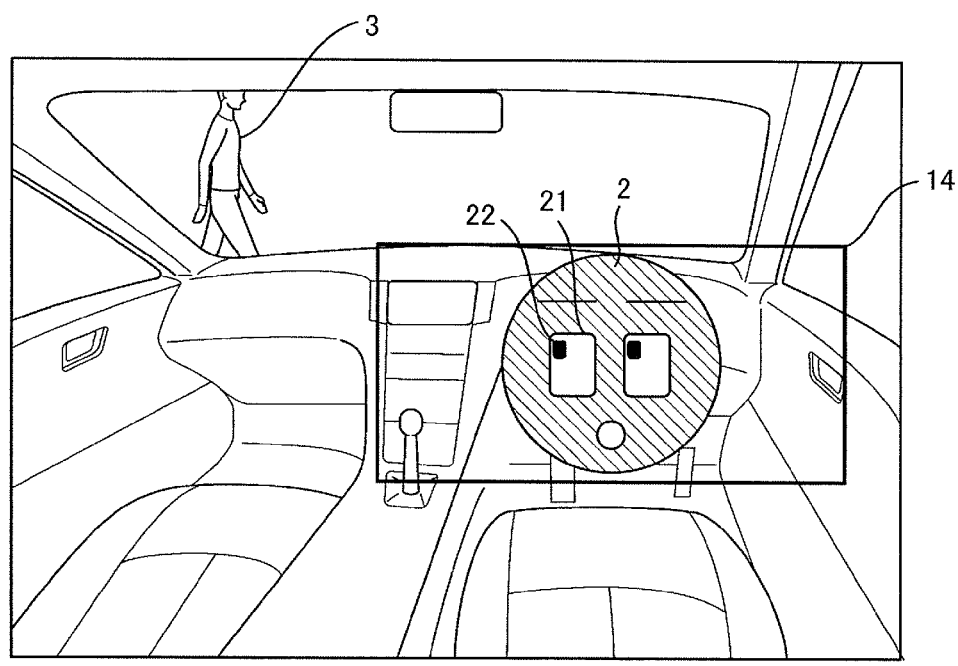
FIGS. 6A and 6B are a set of diagrams each illustrating the relationship between the position of an object and the facial expression of an agent in one or more embodiments of the present invention.
Figure 6B:
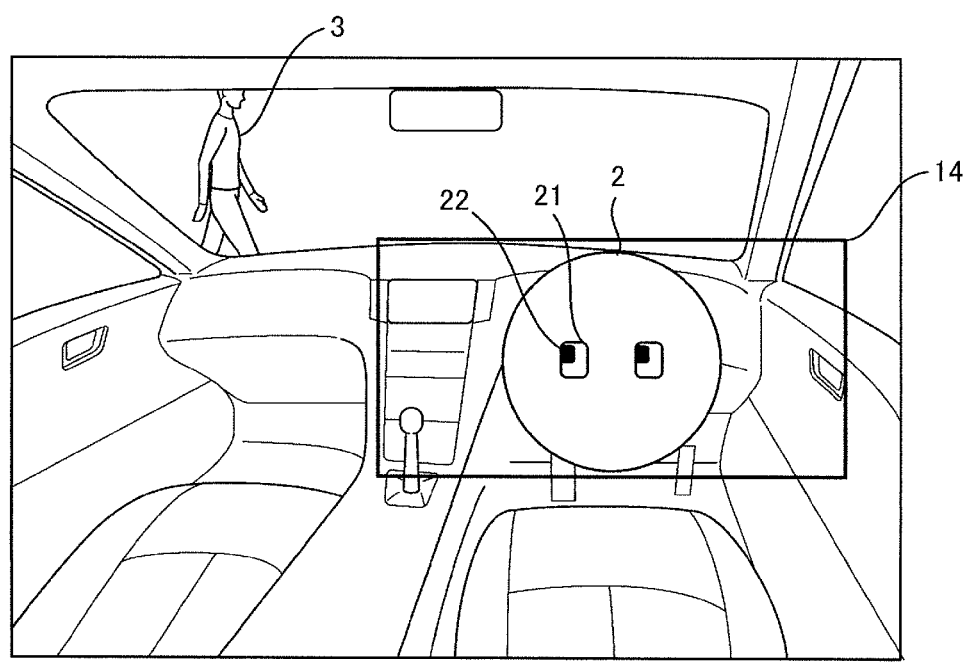

FIGS. 6A and 6B are a set of diagrams for describing the relationship between the position of an object 3 and the facial expression of the agent 2. The examples illustrated in FIGS. 6A and 6B exemplify scenes in which the agent 2 is displayed on the display 14 installed in the instrument panel, but the display 14 and the agent 2 are illustrated with an enlarged size larger than the actual size for easy understanding of the facial expression of the agent 2 (the same applies to FIGS. 7A-7C and FIGS. 15A and 15B). When the ambient detection sensor 11 detects an object 3, the control device 16 can use the facial expression setting function to set the facial expression of the agent 2 on the basis of the position at which the detected object 3 exists.

This will be specifically described. When the ambient detection sensor 11 detects an object 3, the control device 16 can use the facial expression setting function to set the positions of pupils 22 of the agent 2, for example, as illustrated in FIG. 6A, so that the line of sight of the agent 2 is directed to the direction in which the detected object 3 exists. More specifically, when the object 3 is a pedestrian, a bicycle, a motorbike, a car, an obstacle on a road, a structure, a traffic signal, or a road sign, the control device 16 can use the facial expression setting function to set the positions of the pupils 22 of the agent 2, for example, as illustrated in FIG. 6A, so that the distances from the object 3 to the pupils 22 of the agent 2 are the shortest. In other words, the positions of the pupils 22 in the eyes 21 can be set so that the line of sight of the agent 2 is directed to the direction in which the object 3 exists. When the object 3 is a lane mark or a road edge, the control device 16 can use the facial expression setting function to set the positions of the pupils 22 of the agent 2 so that the distances between the center position of the lane mark or road edge and the pupils 22 of the agent 2 are the shortest. In other words, the positions of the pupils 22 in the eyes 21 can be set so that the line of sight of the agent 2 is directed to the direction toward the center position of the lane mark or road edge.

When a certain period of time has passed from the detection of an object 3 and the detection state of the ambient detection sensor 11 transitions from the state of detecting the object 3 to the state of tracking the object 3, the control device 16 uses the facial expression setting function to return the facial expression of the agent 2 to the initial state (facial expression illustrated in FIG. 3A), as illustrated in FIG. 6B. Also in this case, the control device 16 can use the facial expression setting function to set the positions of the pupils 22 of the agent 2 so that the line of sight of the agent 2 is directed to the direction in which the detected object 3 exists.

Figure 7A:
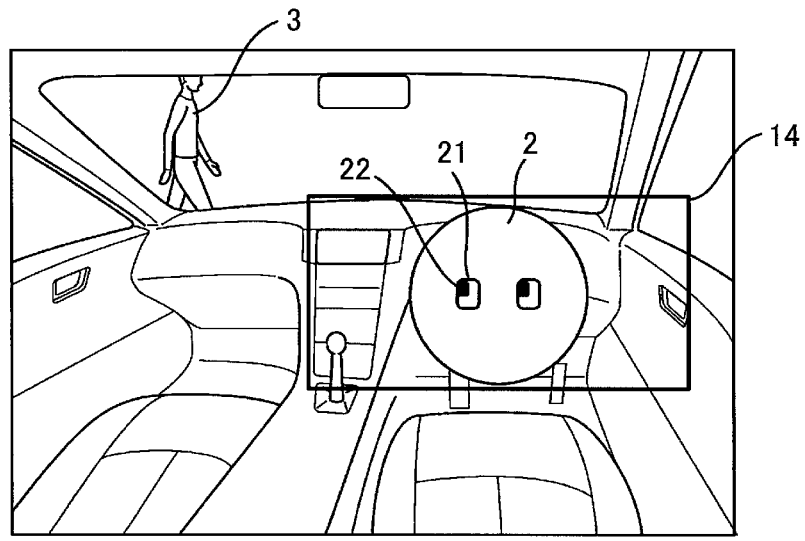
FIGS. 7A-7C are a set of diagrams each illustrating an example of the facial expression of an agent tracking an object in one or more embodiments of the present invention.
Figure 7B:
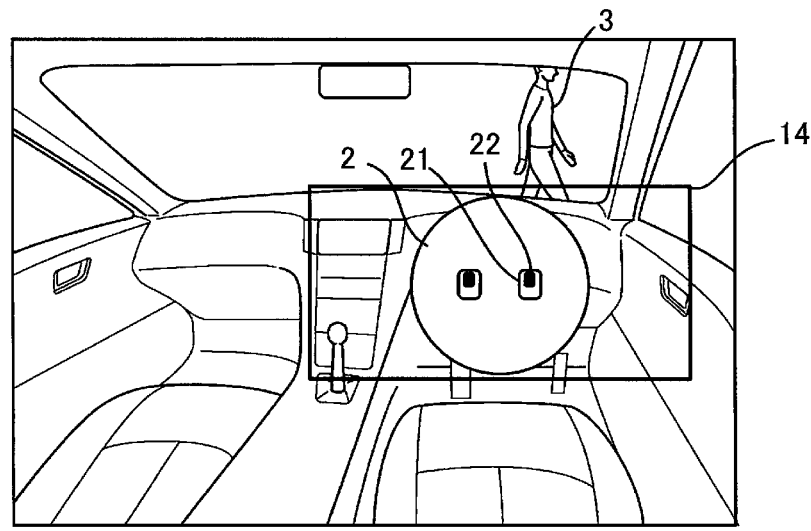
Figure 7C:
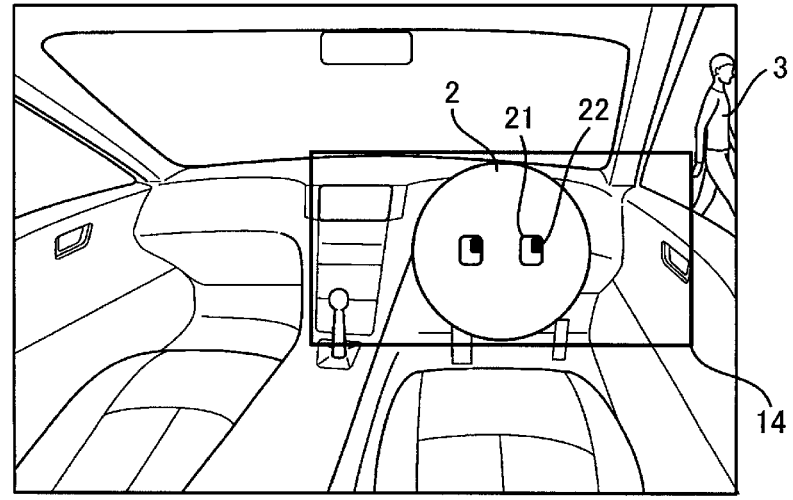

Next, a method of setting the facial expression of the agent 2 when the ambient detection sensor 11 is tracking an object 3 will be described. FIGS. 7A-7C are a set of diagrams each illustrating an example of the facial expression of the agent 2 when the ambient detection sensor 11 is tracking an object 3. When the ambient detection sensor 11 is tracking an object 3, the control device 16 can use the facial expression setting function to shift the positions of the pupils 22 of the agent 2, for example, as illustrated in FIG. 7A to FIG. 7C, so that the line of sight of the agent 2 moves to follow the object 3. In the present embodiment, the ambient detection sensor 11 repeatedly detects the surroundings of the subject vehicle at predetermined time intervals and periodically transmits the detection results to the control device 16. In the present embodiment, the ambient detection sensor 11 and the control device 16 can continuously detect (track) the detected object 3 by storing the features (such as a shape and a color) of the object 3 once detected. The control device 16 uses the facial expression setting function to repeatedly detect the position of the object 3 (including the object 3 being tracked) on the basis of the acquired detection results of the ambient detection sensor 11 and repeatedly set the pupils 22 of the agent 2 at positions at which the distances between the object 3 and the pupils 22 are the shortest. Thus, the control device 16 can use the facial expression setting function to set the facial expression of the agent 2, as illustrated in FIG. 7A to FIG. 7C, so that the line of sight of the agent 2 moves to follow the object 3.

When the ambient detection sensor 11 detects a plurality of objects 3, the control device 16 can use the facial expression setting function to set the facial expression of the agent 2 so that the agent 2 alternately takes a look at the plurality of objects 3. For example, when the ambient detection sensor 110 detects two objects 3: objects 3A and 3B, the facial expression setting function may serve to set the pupils 22 of the agent 2 at positions at which the distances between the object 3A and the pupils 22 of the agent 2 are the shortest. After a predetermined period of time has passed, the facial expression setting function can serve to shift the pupils 22 of the agent 2 to positions at which the distances between the object 3B and the pupils 22 of the agent 2 are the shortest. This can be followed by repetitive similar operations in which, after the predetermined period of time has passed, the facial expression setting function serves to shift the pupils 22 of the agent 2 to positions at which the distances between the object 3A and the pupils 22 of the agent 2 are the shortest and then, after the predetermined period of time has passed, the facial expression setting function serves to shift the pupils 22 of the agent 2 to positions at which the distances between the object 3B and the pupils 22 of the agent 2 are the shortest. The above predetermined period of time can be, for example, but is not limited to, one second.

Figure 8:
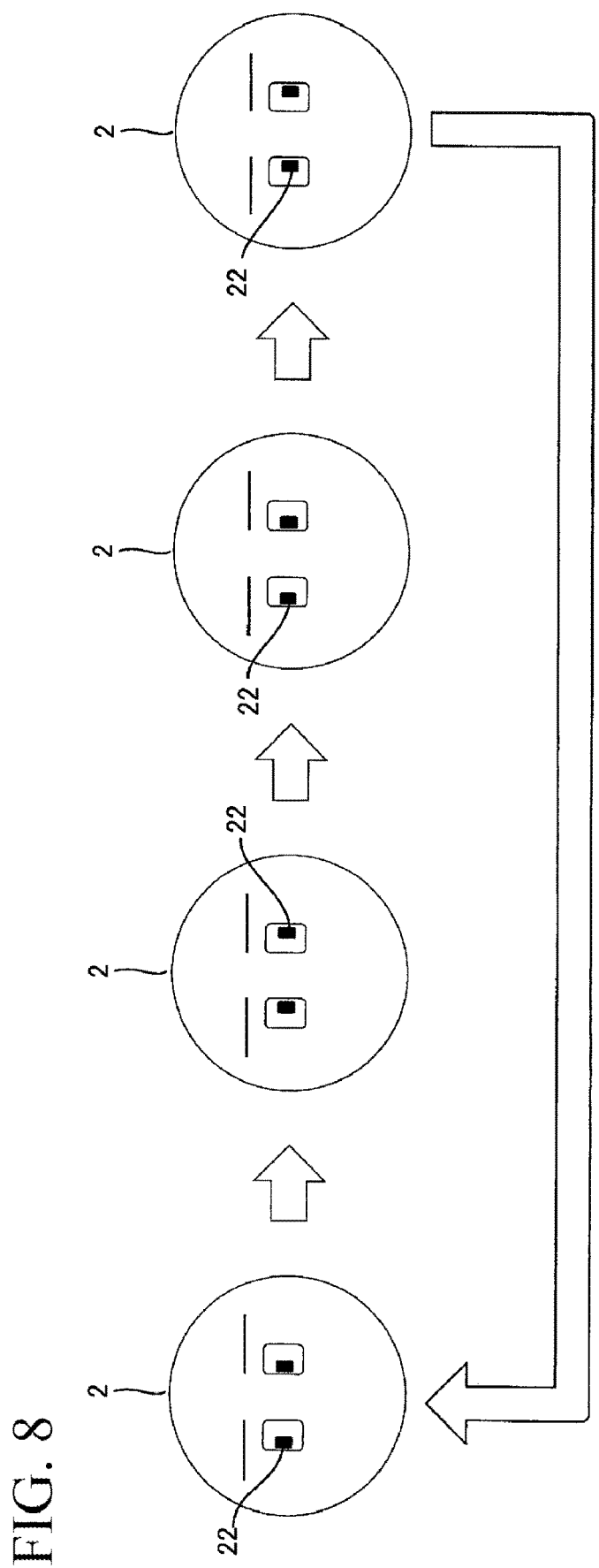
FIG. 8 is a diagram illustrating an example of the facial expression of an agent when losing sight of an object in one or more embodiments of the present invention.

FIG. 8 exemplifies an example of the facial expression of the agent 2 when the ambient detection sensor 11 loses sight of an object 3. When the ambient detection sensor 11 loses sight of an object 3, the control device 16 can use the facial expression setting function to shift the positions of the pupils 22 of the agent 2 alternately to right and left, for example, as illustrated in FIG. 8, thereby setting the facial expression of the agent 2 as if the agent 2 looks for an object 3. When humans lose sight of an object 3, they often look around for the object 3. Such setting of the facial expression therefore allows the driver to intuitively perceive that the ambient detection sensor 11 loses sight of an object 3.

Figure 9:
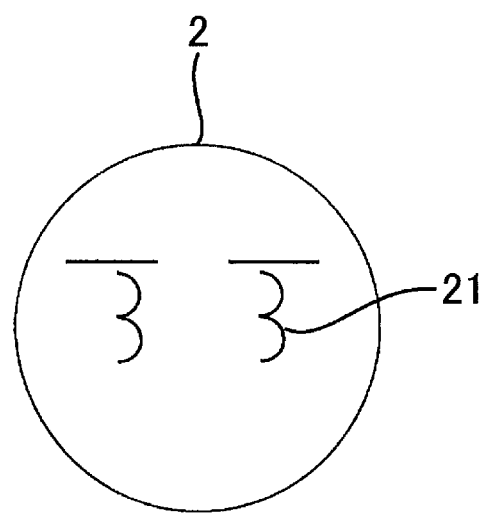
FIG. 9 is a diagram illustrating an example of the facial expression of an agent when the detection of an object cannot be performed in one or more embodiments of the present invention.

FIG. 9 exemplifies an example of the facial expression of the agent 2 when the ambient detection sensor 11 cannot detect an object 3. In some cases, the ambient detection sensor 11 may not be able to detect an object 3 due to weather such as rain, snow or fog, traveling environment such as in nighttime, or dust attached to the ambient detection sensor 11. In such cases, the control device 16 uses the facial expression setting function to set the facial expression as if the agent 2 shuts (closes) the eyes 21, for example, as illustrated in FIG. 9. Humans cannot see surrounding objects with closed eyes, so such setting of the facial expression allows the driver to intuitively perceive that the ambient detection sensor 11 cannot detect an object 3.

In the above-described embodiments, a configuration is exemplified in which the agent 2 is displayed on the display 14 disposed on the instrument panel of the subject vehicle while the image captured around the subject vehicle is not displayed on the display 14. In this case, as illustrated in FIG. 6A and FIG. 6B, when a pedestrian (object 3) is detected ahead of the subject vehicle on the left, the facial expression of the agent 2 is set so that the line of sight of the agent 2 is directed to the left front of the subject vehicle. However, the present invention is not limited to such a configuration, and another configuration may also be employed as below.

Figure 10A:
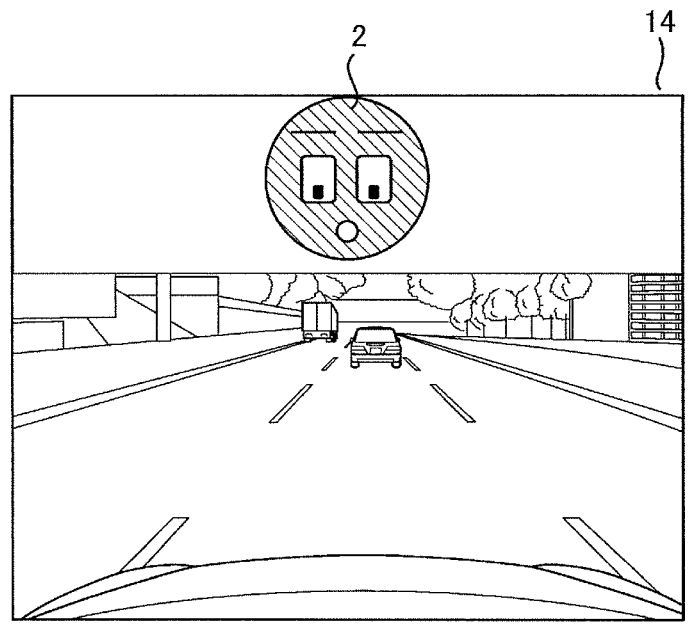
FIGS. 10A and 10B are a set of diagrams each illustrating a display example of an agent when the captured image of an object is displayed on a display in one or more embodiments of the present invention.
Figure 10B:
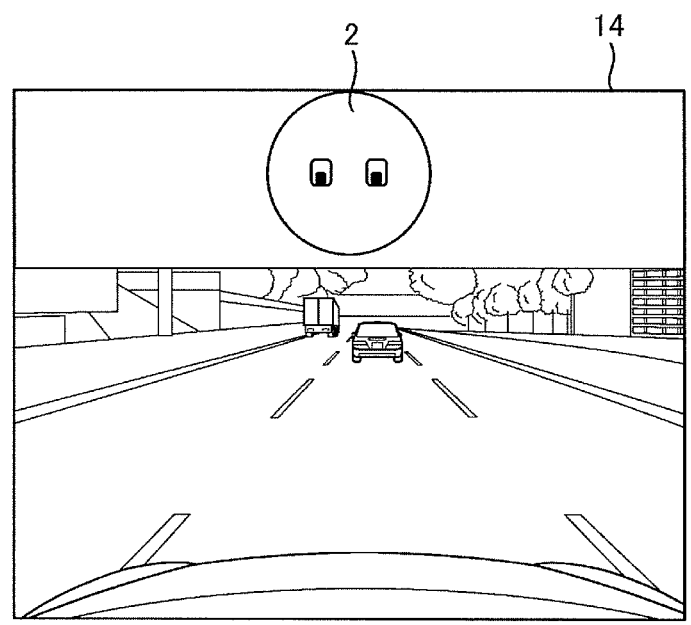

FIGS. 10A and 10B are a set of diagrams each illustrating a display example of the agent 2 in the case of displaying an image captured around the subject vehicle on the display 14. When displaying an image captured around the subject vehicle on the display 14, the control device 16 can use the facial expression setting function to set the facial expression of the agent 2 so that the line of sight of the agent 2 is directed to the direction of the object 3 displayed on the display 14. In the examples illustrated in FIG. 10A and FIG. 10B, the agent 2 is displayed on the upper part of the display 14 while the image captured around the subject vehicle is displayed on the lower part of the display 14. In this case, as illustrated in FIG. 10A and FIG. 10B, the facial expression setting function serves to set the facial expression of the agent 2 so that the line of sight of the agent 2 is directed to the direction of the object 3 (preceding vehicle in the illustrated examples) displayed on the lower part of the display 14. Specifically, the facial expression setting function serves to set the pupils 22 of the agent 2 at positions at which the distances between the object 3 (preceding vehicle in the illustrated examples) displayed in the captured image and the pupils 22 of the agent 2 are the shortest.

In addition or alternatively, when an object 3 is detected, the control device 16 may use the facial expression setting function to enlarge the eyes 21 of the agent 2, add eyebrows and an open mouth to the agent 2, and set the facial color of the agent 2 to yellow, for example, as illustrated in FIG. 10A. Then, when a certain period of time has passed and the detection state of the ambient detection sensor 11 transitions from the state of detecting the object 3 to the state of tracking the object 3, the control device 16 may use the facial expression setting function to return the facial expression of the agent 2 to the initial state, as illustrated in FIG. 10B.

Figure 11A:
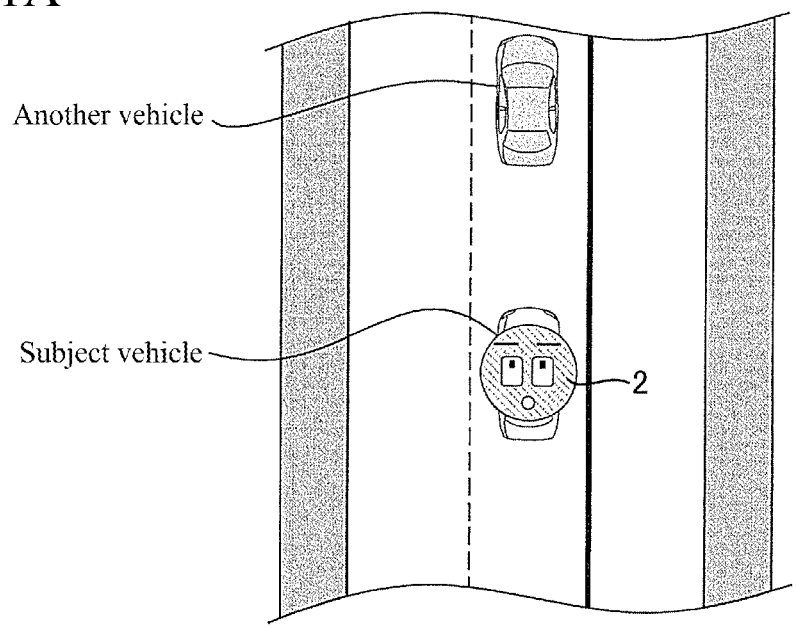
FIGS. 11A and 11B are a set of diagrams each illustrating a display example of an agent when the imitated image of an object is displayed on a display in one or more embodiments of the present invention.
Figure 11B:
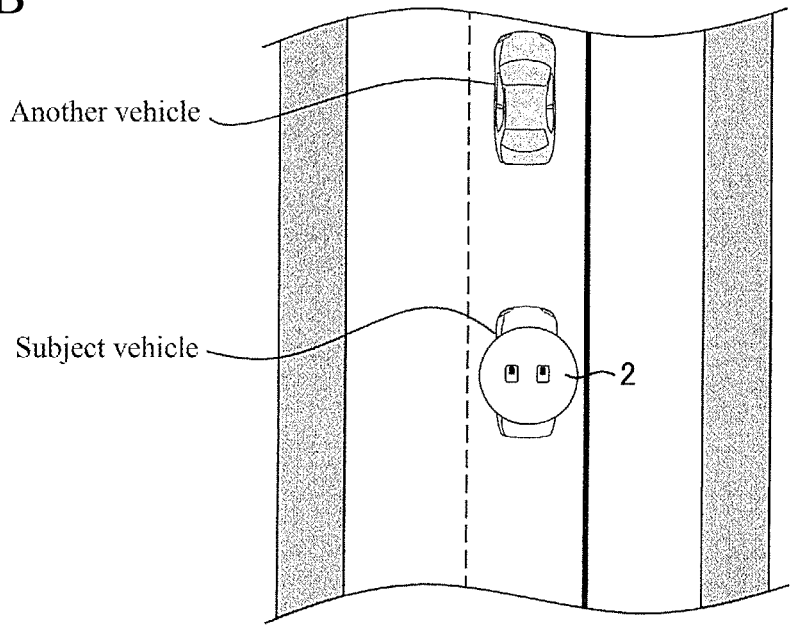

FIGS. 11A and 11B are a set of diagrams each exemplifying a scene in which an image that imitates an object 3 existing around the subject vehicle is displayed on the display 14. In the examples illustrated in FIGS. 11A and 11B, the display 14 displays an overhead view image that includes an image imitating the subject vehicle and an image imitating an object 3 (another vehicle) existing around the subject vehicle. In the examples illustrated in FIGS. 11A and 11B, the arrangement position of the image imitating the other vehicle is a position on the screen corresponding to the actual relative positions of the subject vehicle and the other vehicle and the relative distance therebetween. For example, in the examples illustrated in FIGS. 11A and 11B, the other vehicle is traveling ahead of the subject vehicle, and the image imitating the other vehicle is therefore arranged ahead of the image imitating the subject vehicle.

When an image that imitates an object existing around the subject vehicle is displayed on the display 14, the agent 2 may be superimposed and displayed on the image imitating the subject vehicle. In this case, the control device 16 can use the facial expression setting function to set the facial expression of the agent 2 on the basis of the position of the other vehicle. Specifically, as illustrated in FIG. 11A and FIG. 11B, the control device 16 uses the facial expression setting function to set the facial expression of the agent 2 so that the line of sight of the agent 2 is directed to the direction of the other vehicle 3 existing ahead of the subject vehicle.

Also in the scenes illustrated in FIGS. 11A and 11B, when an object 3 is detected, the control device 16 may use the facial expression setting function to enlarge the eyes 21 of the agent 2, add eyebrows and an open mouth to the agent 2, and set the facial color of the agent 2 to yellow or the like, as illustrated in FIG. 11A. Then, when a certain period of time has passed and the detection state of the ambient detection sensor 11 transitions from the state of detecting the object 3 to the state of tracking the object 3, the control device 16 may use the facial expression setting function to return the facial expression of the agent 2 to the initial state, as illustrated in FIG. 11B.

The control device 160 can use the travel control function to control the automated driving travel of the subject vehicle. Specifically, the control device 16 uses the travel control function to automatically execute the driving operation, which is ordinarily performed by the driver, through operating the drive control device 15 to control the driving mechanisms such as an engine and a brake and the steering mechanism such as a steering actuator on the basis of the detection results of the ambient detection sensor 11 and given travel conditions (such as traffic rules and a planned travel route). For example, the control device 16 uses the travel control function to perform the lane keeping control, which controls the traveling position of the subject vehicle in the width direction, through operating the drive control device 15 to control the operation of the steering actuator or the like so that the subject vehicle travels in a certain lane. In addition or alternatively, the control device 16 can use the travel control function to perform the follow-up travel control, which is for automatically following a preceding vehicle, through operating the drive control device 15 to control the operation of the driving mechanisms such as the engine and brake so that the subject vehicle travels with a certain distance from the preceding vehicle. In addition or alternatively, the control device 16 can use the travel control function to automatically execute the right or left turn at an intersection, lane change, parking, stopping, and other necessary actions through controlling the driving mechanisms such as the engine and brake and the steering mechanism such as the steering actuator on the basis of the detection results of the ambient detection sensor 11 and the given travel conditions.

Figure 12:
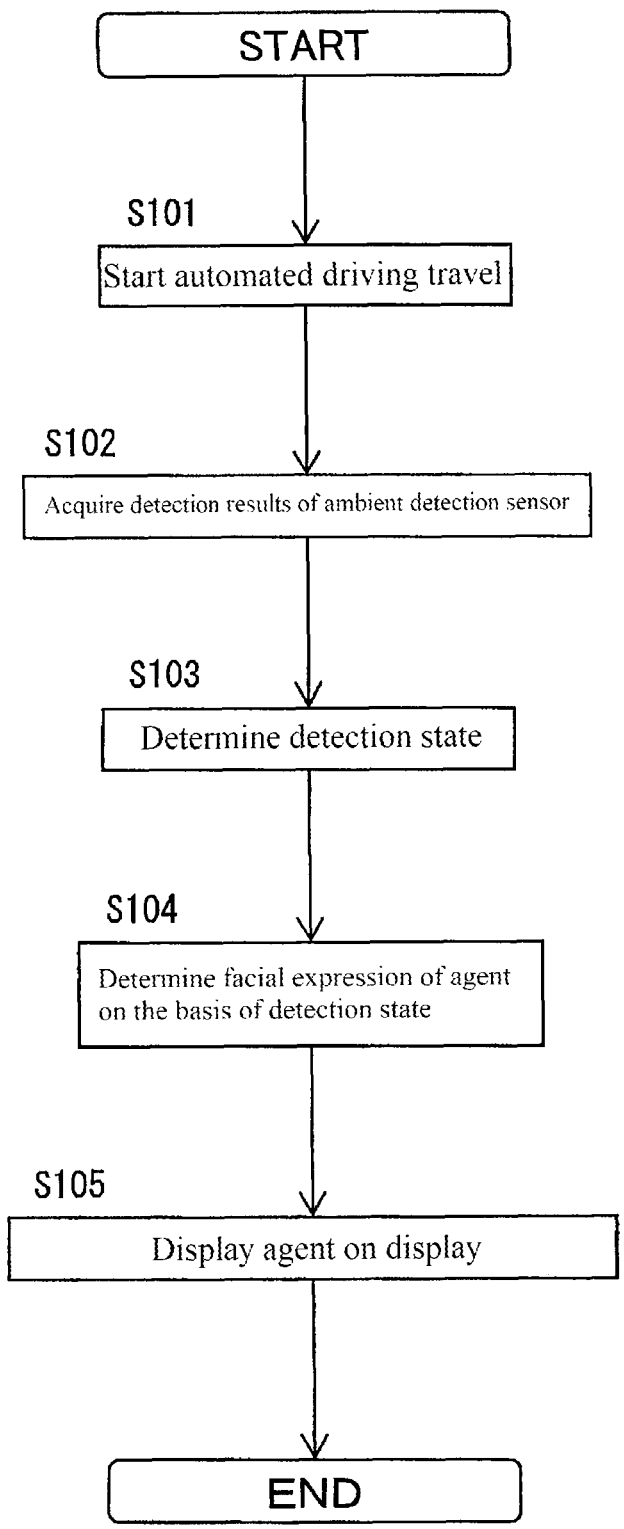
FIG. 12 is a flowchart illustrating an example of the automated driving process according to a first embodiment of the present invention.

The automated driving process according to the first embodiment will then be described with reference to FIG. 12. FIG. 12 is a flowchart illustrating an example of the automated driving process according to the first embodiment. The automated driving process described below is executed by the control device 16. First, in step S101, the travel control function serves to start the automated driving travel. For example, when the driver turns on the automated driving switch (not illustrated), the travel control function serves to acquire the start signal for the automated driving travel from the automated driving switch and starts the automated driving travel.

In step S102, the detection result acquisition function serves to acquire the detection results of the ambient detection sensor 11. Then, in step S103, the detection state determination function serves to determine the detection state of the ambient detection sensor 11 on the basis of the detection results of the ambient detection sensor 11 acquired in step S102.

In step S104, the facial expression setting function serves to set the facial expression of the agent 2 on the basis of the detection state of the ambient detection sensor 11 determined in step S103. For example, as illustrated in FIG. 4 to FIG. 9, the facial expression of the agent 2 is set as a facial expression corresponding to the detection state of the ambient detection sensor 11 determined in step S103.

In step S105, the agent display function serves to perform the process of displaying the agent 2 on the screen of the display 14 with the facial expression of the agent 2 which is set in step S104.

As described above, in the present embodiment, the facial expression of the agent 2 to be displayed on the display 14 is set on the basis of the detection state of the ambient detection sensor 11. In the present embodiment, the agent 2 has at least sites corresponding to the eyes 21, and the display form of the eyes 21 of the agent 2 can be set in accordance with the detection state of the ambient detection sensor 11 thereby to express the detection state of the ambient detection sensor 11. For example, when the ambient detection sensor 11 is searching for an object 3, a state of opening the eyes 21 and a state of closing the eyes 21 are repeated, as illustrated in FIG. 4, thereby to set the facial expression as if the agent 2 is searching for an object 3. In addition or alternatively, when the ambient detection sensor 11 detects an object, the eyes of the agent 2 are enlarged, as illustrated in FIG. 5A, thereby to set the facial expression as if the agent 2 finds something. In addition or alternatively, when the ambient detection sensor 11 is tracking an object 3, the facial expression of the agent 2 is set, as illustrated in FIG. 7A to FIG. 7C, so that the pupils 22 of the agent 2 are shifted to follow the object 3. In addition or alternatively, when the ambient detection sensor 11 loses sight of an object 3, the pupils 22 of the agent 2 are shifted alternately to right and left, as illustrated in FIG. 8, thereby to set the facial expression of the agent 2 as if the agent 2 looks for the lost object 3. In addition or alternatively, when the ambient detection sensor 11 cannot execute detection of an object 3, the facial expression is set as if the agent 2 shuts (closes) the eyes 21, as illustrated in FIG. 9. Thus, the detection state of the ambient detection sensor 11 can be expressed using the facial expression of the agent 2 thereby to allow the driver to intuitively perceive the detection state of the ambient detection sensor 11.

When the driver cannot perceive the detection state of the ambient detection sensor 11 during the automated driving travel, it may be difficult for the driver to make a prediction as to how the automated driving travel performs the drive and travel of the subject vehicle or as to whether necessary drive and travel, such as avoidance of objects, are performed. However, fortunately, in the automated driving apparatus 1 according to the present embodiment, the detection state of the ambient detection sensor 11 is displayed using the personified agent 2 as an intermediate during the automated driving travel and the driver can therefore be allowed to intuitively perceive the detection state of the ambient detection sensor 11. As a result, the driver can predict the drive and travel performed by the automated driving travel, for example, the sudden stop due to a pedestrian or bicycle rushing out, and a sense of security for the automated driving can be given to the driver. In addition, when the ambient detection sensor 11 does not detect an object, the driver can intuitively perceive that the ambient detection sensor 110 does not detect an object. When an object 3 that is not detected by the ambient detection sensor 11 comes close to the subject vehicle, therefore, the driver can be made to perform the necessary driving operation, for example, the braking operation.

Moreover, in the present embodiment, when the ambient detection sensor 11 detects an object 3, the positions of pupils 22 of the agent 2 can be set so that the line of sight of the agent 2 is directed to the direction in which the detected object 3 exists, as illustrated in FIGS. 6A and 6B and FIGS. 7A-7C. This allows the driver to appropriately perceive the object 3 (or the position thereof) detected by the ambient detection sensor 11.

Furthermore, in the present embodiment, the detection state of the ambient detection sensor 11 is displayed using the agent 2, and the information on an object 3 detected by the ambient detection sensor 11 can thereby be conveyed to the driver in an integrated manner as compared with the case in which the agent 2 is not used. For example, in a captured image displayed on the display 14, when the agent 2 is not used as in the case in which a frame line indicating the detection is superimposed and displayed on an object 3 detected by the ambient detection sensor 11, the amount of information presented to the driver increases as the detection accuracy of the ambient detection sensor 11 increases. That is, it may be difficult for the driver to intuitively perceive the detection state of the ambient detection sensor 11 because the information on the captured image and the frame line superimposed and displayed on the information are displayed in an entangled manner. Even in such a case, the detection state of the ambient detection sensor 11 can be displayed in an integrated manner using the agent 2 thereby to allow the driver to intuitively perceive the detection state of the ambient detection sensor 11 without reading out the detection state from the entire captured image.

Second Embodiment

An automated driving apparatus according to a second embodiment will be described. The automated driving apparatus 1 according to the second embodiment has the same configuration as that of the automated driving apparatus 1 according to the first embodiment illustrated in FIG. 1 and operates in the same manner as in the above-described first embodiment except that it operates as described below.

The control device 16 according to the second embodiment has an explicitness determination value calculation function and an implicitness determination value calculation function in addition to the functions of the first embodiment. The explicitness determination value calculation function serves to calculate an explicitness determination value for determining whether or not to get the driver's attention, on the basis of an object detected by the ambient detection sensor 11 (this object will be referred to as an "explicit object," hereinafter). The implicitness determination value calculation function serves to estimate whether or not an object that is not detected by the ambient detection sensor 11 (this object will be referred to as an "implicit object," hereinafter) exists and calculate an implicitness determination value for determining whether or not to get the driver's attention.

First, the explicitness determination value calculation function of the control device 16 will be described. The explicitness determination value calculation function is a function of specifying an object 3 detected by the ambient detection sensor 11 as an explicit object on the basis of the detection results of the ambient detection sensor 11. Examples of such an explicit object include pedestrians, bicycles, motorbikes, cars, obstacles on a road, structures, traffic signals, road signs, lane marks, and road edges which are detected by the ambient detection sensor 11.

When the explicit object is a three-dimensional object on a road, such as a pedestrian, bicycle, motorbike, car, obstacle on a road, or structure, the control device 16 can use the explicitness determination value calculation function to calculate a degree of proximity between the subject vehicle and the explicit object. Specifically, the control device 16 uses the explicitness determination value calculation function to calculate a distance from the subject vehicle to the explicit object, a time to contact (TTC) with the explicit object, or a time headway (THW) on the basis of the positional information and speed information of the explicit object detected by the ambient detection sensor 11, the positional information of the subject vehicle detected by the subject vehicle position detection device 13, and the speed information of the subject vehicle detected by the vehicle speed sensor 12. Then, the control device 16 uses the explicitness determination value calculation function to calculate the degree of proximity (possibility of approach) between the subject vehicle and the explicit object as an explicitness determination value on the basis of the distance from the subject vehicle to the explicit object, the TTC, or the THW. For example, the control device 16 uses the explicitness determination value calculation function to calculate a higher explicitness determination value as the distance from the subject vehicle to the explicit object is shorter, the TTC with the explicit object is shorter, or the THW to the explicit object is shorter.

In addition or alternatively, when the explicit object is a line-like two-dimensional object such as a lane mark or a road edge, the control device 16 can use the explicitness determination value calculation function to calculate the shortest distance from the subject vehicle to the explicit object or a time to lane crossing (TLC) for the subject vehicle to cross the explicit object. Then, the control device 16 can use the explicitness determination value calculation function to calculate the explicitness determination value on the basis of the shortest distance between the subject vehicle and the explicit object or the TLC. For example, the control device 16 uses the explicitness determination value calculation function to calculate a higher explicitness determination value as the shortest distance from the subject vehicle to the explicit object is shorter or the TLC is shorter.

In addition or alternatively, when the explicit object is a traffic signal, the control device 16 can use the explicitness determination value calculation function to calculate the explicitness determination value on the basis of the signal color of the traffic signal. For example, when the signal color of the traffic signal is yellow, the control device 16 uses the explicitness determination value calculation function to calculate a higher explicitness determination value than that when the signal color of the traffic signal is blue (green). When the signal color of the traffic signal is red, the control device 16 uses the explicitness determination value calculation function to calculate a higher explicitness determination value than that when the signal color of the traffic signal is yellow. When the signal color of the traffic signal is red, the control device 16 uses the explicitness determination value calculation function to calculate a higher explicitness determination value as the traveling speed of the subject vehicle is higher or the distance from the subject vehicle to the stop line is shorter.

In addition or alternatively, when the explicit object is a road sign, the control device 16 can use the explicitness determination value calculation function to calculate the explicitness determination value on the basis of the difference between the legal speed and the traveling speed of the subject vehicle. For example, the control device 16 uses the explicitness determination value calculation function to calculate a higher explicitness determination value as the difference between the legal speed and the traveling speed of the subject vehicle (traveling speed of subject vehicle—legal speed) is larger.

When two or more explicit objects are detected, the control device 16 can use the explicitness determination value calculation function to calculate respective explicitness determination values for these explicit objects and select the highest explicitness determination value among the calculated respective explicitness determination values as a final explicitness determination value.

Thus, on the basis of the explicit object detected by the ambient detection sensor 11, the control device 16 can use the explicitness determination value calculation function to evaluate the degree of proximity between the subject vehicle and the explicit object, the possibility that the subject vehicle deviates from the lane or road, or the possibility that the subject vehicle violates the traffic rules, as the explicitness determination value.

The implicitness determination value calculation function of the control device 16 will then be described. The implicitness determination value calculation function is a function of estimating whether or not an object (implicit object) that is not detected by the ambient detection sensor 11 exists and calculating an implicitness determination value for determining whether or not to get the driver's attention.

Specifically, the control device 16 uses the implicitness determination value calculation function to detect a stopped bus and a parked vehicle because an implicit object such as a pedestrian or a bicycle may often rush out from behind the stopped bus or parked vehicle. Then, when a stopped bus or a parked vehicle is detected, the control device 16 uses the implicitness determination value calculation function to estimate that an implicit object such as a pedestrian or a bicycle exists behind the stopped bus or parked vehicle and calculate a higher implicitness determination value than that when a stopped bus or a parked vehicle is not detected. In addition or alternatively, when approaching a pedestrian crosswalk or an intersection with no traffic signals, the control device 16 may use the implicitness determination value calculation function to estimate that an implicit object such as a pedestrian or a bicycle rushes out at the pedestrian crosswalk or intersection with no traffic signals and calculate a higher implicitness determination value than that when not approaching a pedestrian crosswalk or an intersection with no traffic signals.

In addition or alternatively, the control device 16 uses the implicitness determination value calculation function to make a prediction of a degree of possibility that the subject vehicle will deviate from the lane or road in the future (this degree of possibility can be said as a probability of the occurrence of an event), on the basis of an implicit object that is not detected by the ambient detection sensor 11, and calculate an implicitness determination value on the basis of the predicted degree of possibility. For example, the control device 16 uses the implicitness determination value calculation function to determine whether or not a curve exists ahead of the subject vehicle, from the map information. When a curve exists ahead of the subject vehicle, the control device 16 uses the implicitness determination value calculation function to determine that the degree of possibility (probability of occurrence) that the subject vehicle will deviate from the lane or road in the future is high and calculate a higher implicitness determination value than that when no curve exists ahead of the subject vehicle. The control device 16 may use the implicitness determination value calculation function to calculate a higher implicitness determination value as the curvature of the curve is higher, the distance from the subject vehicle to the curve is shorter, or the speed of the subject vehicle is higher.

Thus, the control device 16 uses the implicitness determination value calculation function to estimate the existence of an implicit object that is not detected by the ambient detection sensor 11 (i.e. assume that an object 3 exists) and calculate the degree of possibility that the subject vehicle and the implicit object come close to each other or the possibility that the subject vehicle will deviate from the lane or road in the future, as the implicitness determination value for determining whether or not to get the driver's attention.

The control device 16 according to the second embodiment can use the facial expression setting function to set the facial expression of the agent 2 on the basis of the explicitness determination value calculated using the explicitness determination value calculation function and the implicitness determination value calculated using the implicitness determination value calculation function.

Figure 13A:
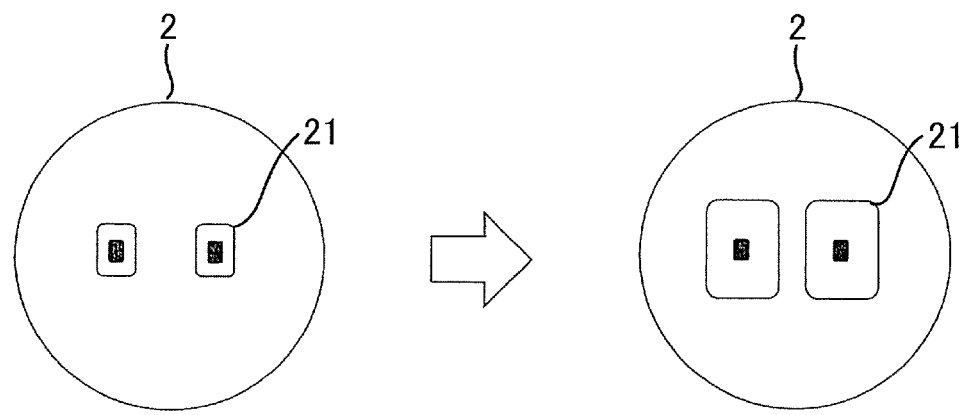
FIGS. 13A and 13B are a set of diagrams each illustrating an example of the facial expression of an agent when an explicitness determination value is high in one or more embodiments of the present invention.
Figure 13B:
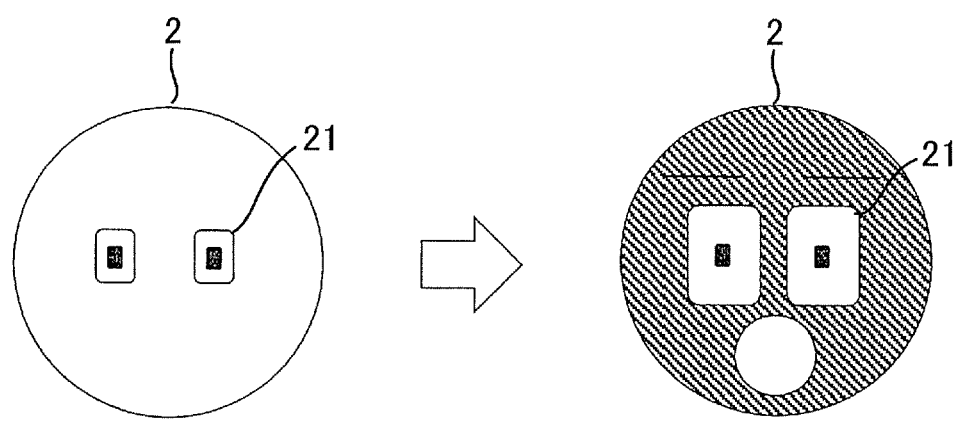

When the explicitness determination value is a first threshold or more, the control device 16 uses the facial expression setting function to enlarge the eyes 21 of the agent 2, for example, as illustrated in FIG. 13A, thereby to set the facial expression as if the agent 2 is surprised. In addition or alternatively, when the explicitness determination value is the first threshold or more, the control device 16 can use the facial expression setting function to add eyebrows and an open mouth to the agent 2, for example, as illustrated in FIG. 13B, and change the facial color of the agent 2 to red (indicated by thick diagonal lines in FIG. 13B, the same applies to FIG. 15B, FIG. 16B, and FIG. 17B). This can get the driver's attention to the explicit object detected by the ambient detection sensor 11.

When the implicitness determination value is a second threshold or more, the control device 16 uses the facial expression setting function to shift the pupils 22 of the agent 2 to right and left, for example, as illustrated in FIG. 14A, thereby to set the facial expression as if the agent 2 shows an anxious look. The control device 16 may also use the facial expression setting function to shift the pupils 22 of the agent 2 to right and left, pull down the outer corners of eyebrows, pull down the outer corners of the mouth, and set the facial color to yellow, as illustrated in FIG. 14B. This can get the driver's attention to the implicit object which is not detected by the ambient detection sensor 11.

Figure 15A:
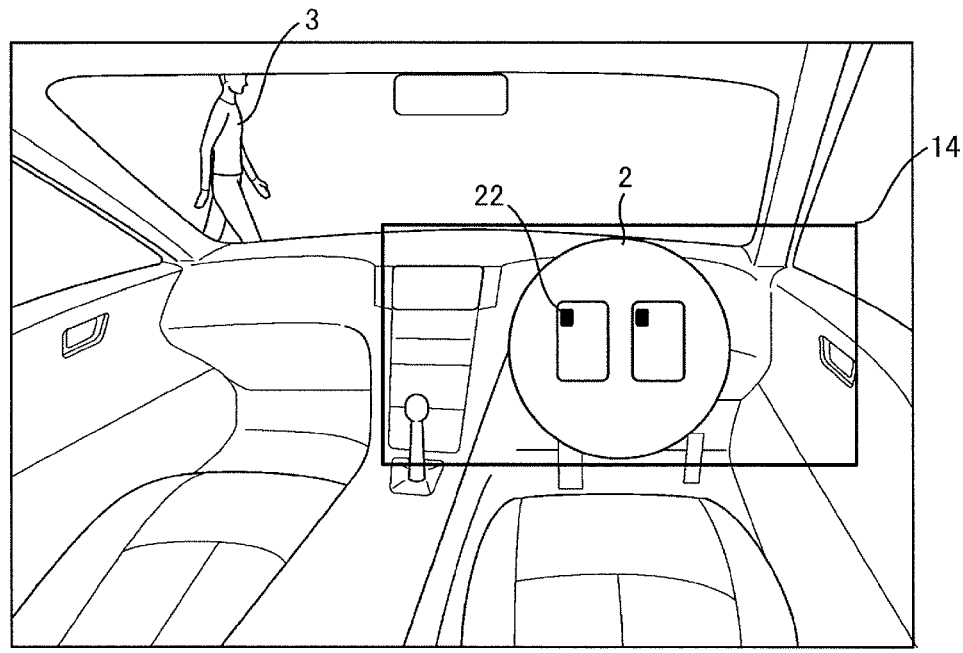
FIGS. 15A and 15B are a set of diagrams each illustrating the relationship between the position of an explicit object and the facial expression of an agent in one or more embodiments of the present invention.
Figure 15B:
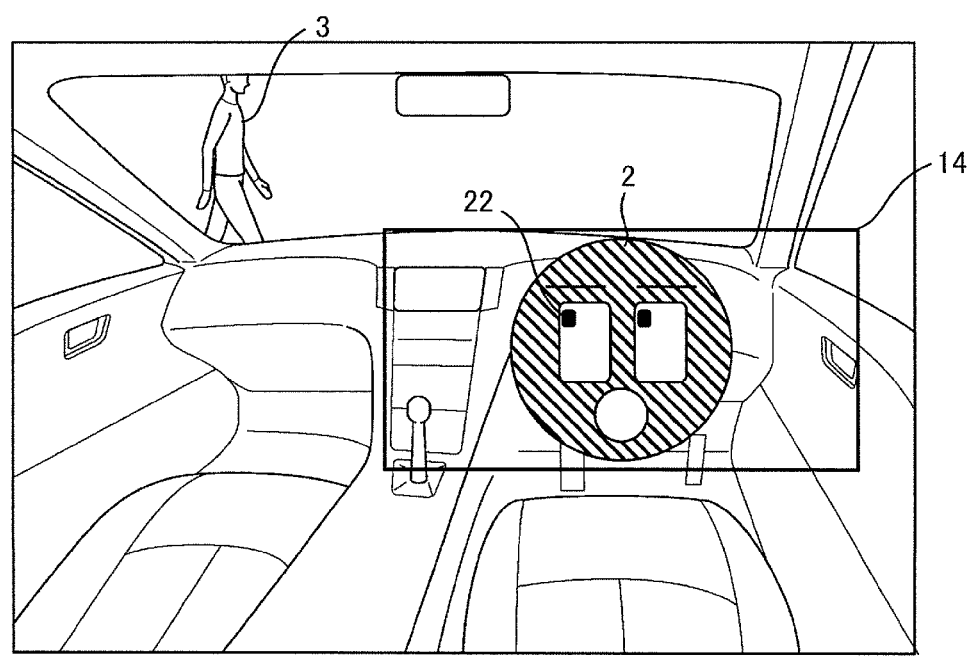

In addition or alternatively, when the explicitness determination value is the first threshold or more, the control device 16 may use the facial expression setting function to set the positions of pupils 22 of the agent 2, for example, as illustrated in FIG. 15A, so that the distances between the explicit object and the pupils 22 of the agent 2 are the shortest. This allows the driver to perceive the explicit object (or the position thereof) detected by the ambient detection sensor 11. In addition or alternatively, the control device 16 can use the facial expression setting function to enlarge the eyes 21 of the agent 2, add eyebrows and an open mouth to the agent 2, and change the facial color of the agent 2 to red, for example, as illustrated in FIG. 15B. This can more promote getting the driver's attention.

In addition or alternatively, when the explicit object is moving, the control device 16 may use the facial expression setting function to set the facial expression of the agent 2 so that the line of sight of the agent 2 follows the object 3. For example, the control device 16 may use the facial expression setting function to repeatedly shift the pupils 22 of the agent 2 to positions at which the distances between the explicit object and the pupils 22 of the agent 2 are the shortest, thereby allowing the line of sight of the agent 2 to follow the explicit object.

Figure 16A:
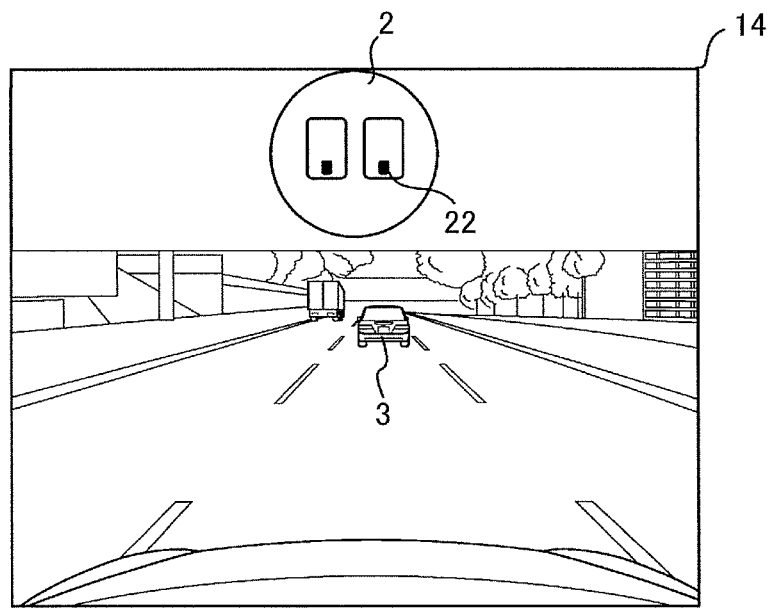
FIGS. 16A and 16B are a set of diagrams each illustrating a display example of an agent when the captured image of an explicit object is displayed on a display in one or more embodiments of the present invention.
Figure 16B:
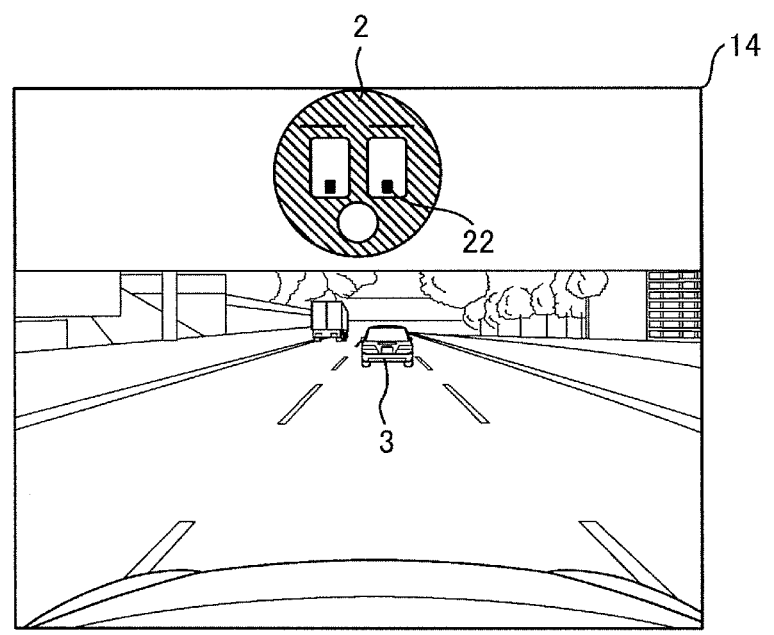

In addition or alternatively, when the explicit object imaged by the camera is displayed on the display 14, the control device 16 may use the facial expression setting function to set the facial expression of the agent 2, for example, as illustrated in FIG. 16A, so that the line of sight of the agent 2 is directed to the explicit object (the object 3 of the figure is a preceding vehicle) displayed on the display 14. For example, when the explicitness determination value for a preceding vehicle becomes the first threshold or more due to the preceding vehicle as an explicit object suddenly decelerating or due to another vehicle as an explicit object suddenly cutting in ahead of the subject vehicle, the control device 16 may use the facial expression setting function to enlarge the eyes 21 of the agent 2 and set the facial expression of the agent 2 so that the line of sight of the agent 2 is directed to the explicit object displayed on the display 14, as illustrated in FIG. 16A. In such a case, as illustrated in FIG. 16B, the control device 16 can also use the facial expression setting function to enlarge the eyes 21 of the agent 2, add eyebrows and an open mouth to the agent 2, and change the facial color of the agent 2 to red.

Figure 17A:
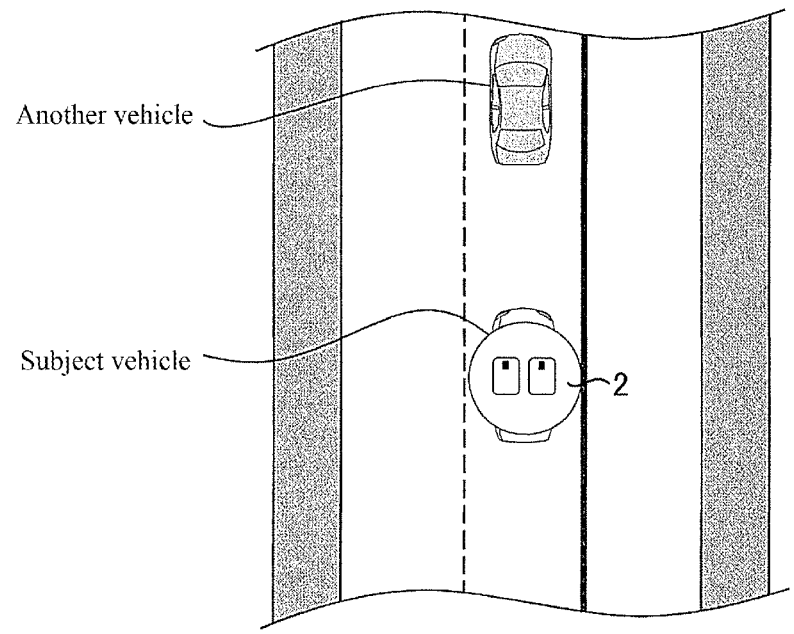
FIGS. 17A and 17B are a set of diagrams each illustrating a display example of an agent when the imitated image of an explicit object is displayed on a display in one or more embodiments of the present invention.
Figure 17B:
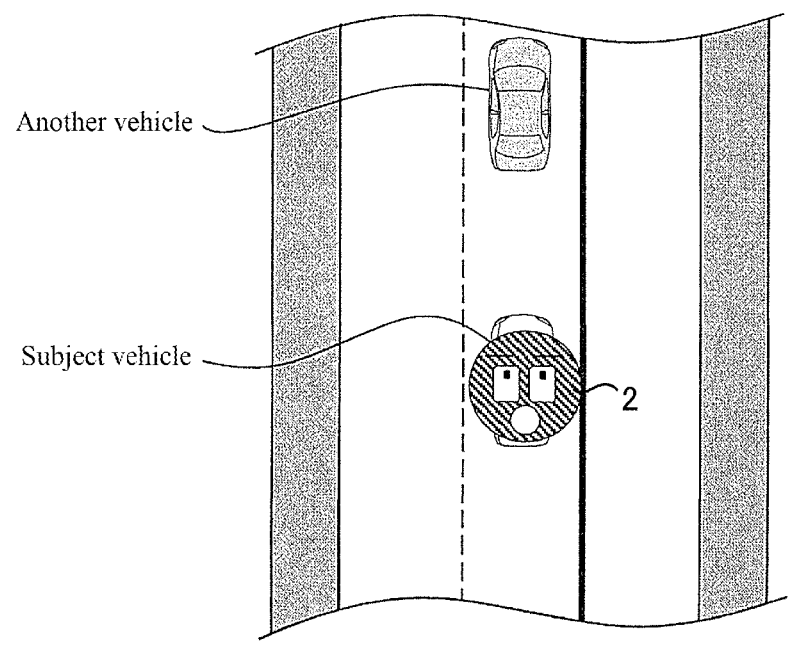

In addition or alternatively, when an image that imitates an explicit object existing around the subject vehicle is displayed on the display 14, the control device 16 can use the facial expression setting function to set the facial expression of the agent 2 so that the line of sight of the agent 2 is directed to the direction in which the image of the explicit object rendered on the display 14 exists. For example, when the explicitness determination value for a preceding vehicle becomes the first threshold or more due to the preceding vehicle as an explicit object suddenly decelerating or due to another vehicle as an explicit object suddenly cutting in ahead of the subject vehicle, the control device 16 can use the facial expression setting function to set the facial expression of the agent 2 so that the line of sight of the agent 2 is directed to the direction in which the image of the explicit object 3 displayed on the display 14 exists, for example, as illustrated in FIG. 17A. In such a case, as illustrated in FIG. 17B, the control device 16 can also use the facial expression setting function to enlarge the eyes 21 of the agent 2, add eyebrows and an open mouth to the agent 2, and change the facial color of the agent 2 to red.

Figure 18:
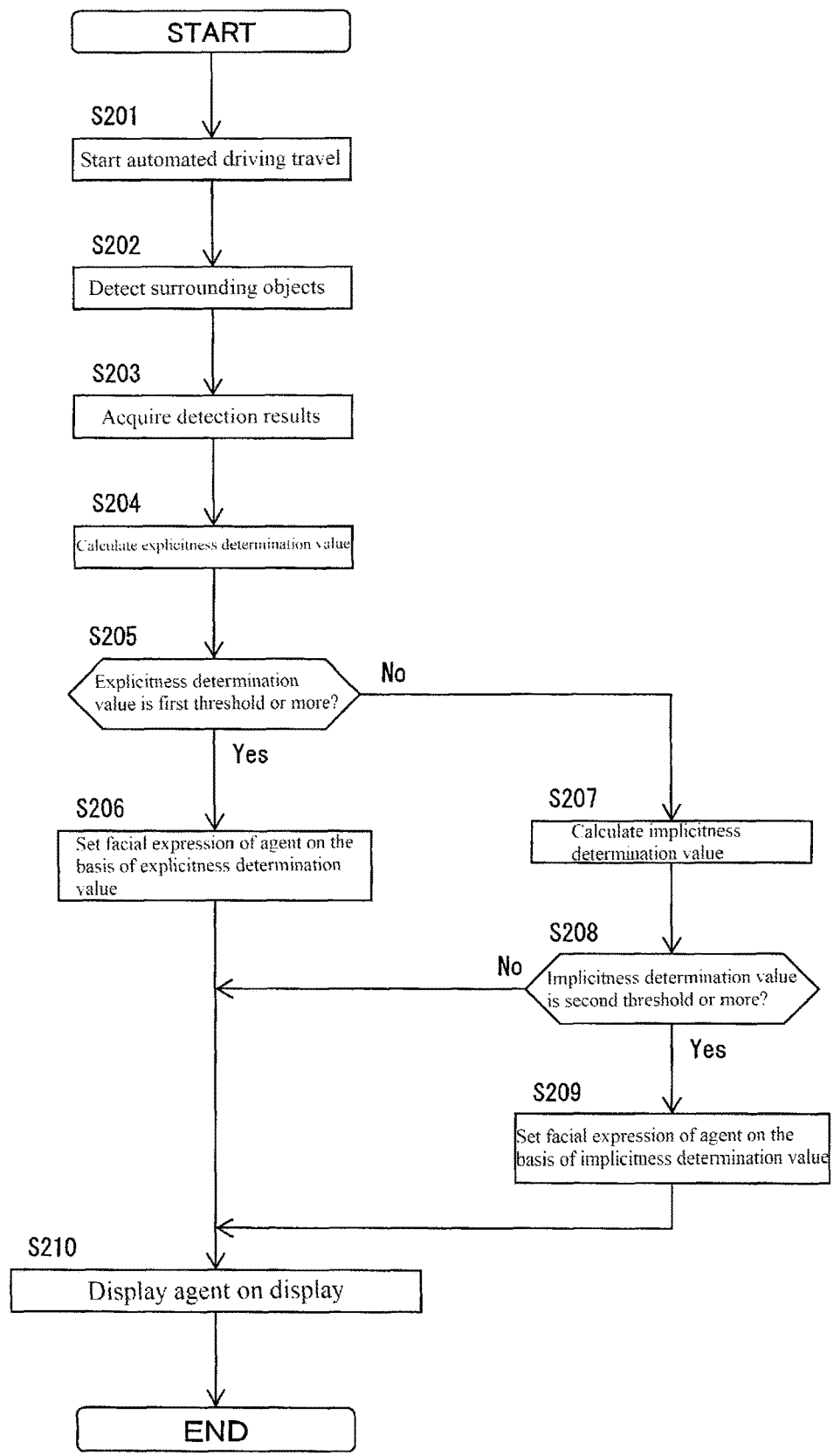
FIG. 18 is a flowchart illustrating an example of the automated driving process according to a second embodiment of the present invention.

The automated driving process according to the second embodiment will then be described. FIG. 18 is a flowchart illustrating an example of the automated driving process according to the second embodiment. The automated driving process described below is executed by the control device 16.

In steps S201 to S203, the same process as in steps S101 to S103 of the first embodiment is performed. That is, when the automated driving travel is started (step S201), an object 3 existing around the subject vehicle is detected (step S202) and the detection results are acquired (step S203).

In step S204, the explicitness determination value calculation function serves to calculate the explicitness determination value on the basis of the detection results of the ambient detection sensor 11 detected in step S203. For example, the explicitness determination value calculation function serves to calculate the distance from the subject vehicle to the explicit object, the TTC with the explicit object, or the THW to the explicit object as the explicitness determination value.

Then, in step S205, the explicitness determination value calculation function serves to determine whether or not the explicitness determination value calculated in step S204 is the first threshold or more. Although the first threshold is not particularly limited, it is preferred to appropriately set a value suitable for getting the driver's attention when the explicitness determination value is the first threshold or more by experiment or the like. When the explicitness determination value is the first threshold value or more, the routine proceeds to step S206, while when the explicitness determination value is less than the first threshold, the routine proceeds to step S207.

In step S206, the facial expression setting function serves to set the facial expression of the agent 2 on the basis of the explicitness determination value calculated in step S204. For example, the facial expression setting function serves to enlarge the eyes 21 of the agent 2, as illustrated in FIG. 15A, FIG. 16A, or FIG. 17A, or add eyebrows and an open mouth to the face of the agent 2 and change the facial color of the agent 2 to red, as illustrated in FIG. 15B, FIG. 16B, or FIG. 17B. In addition or alternatively, the facial expression setting function may serve to set the positions of the pupils 22 of the agent 2 so that the distances between the pupils 22 of the agent 2 and the explicit object are the shortest.

On the other hand, when a determination is made in step S205 that the explicitness determination value is less than the first threshold, the routine proceeds to step S207. In step S207, the implicitness determination value calculation function serves to calculate the implicitness determination value on the basis of the detection results acquired in step S203. For example, the implicitness determination value calculation function serves to estimate the existence of an implicit object that is not detected by the ambient detection sensor 11 and calculate the degree of proximity between the subject vehicle and the implicit object or the possibility that the subject vehicle will deviate from the lane or road edge in the future, as the implicitness determination value.

Then, in step S208, the implicitness determination value calculation function serves to determine whether or not the implicitness determination value calculated in step S207 is the second threshold or more. Although the second threshold is not particularly limited, it is preferred to appropriately set a value suitable for getting the driver's attention when the implicitness determination value is the second threshold or more by experiment or the like. When the implicitness determination value is the second threshold or more, the routine proceeds to step S209. In step S209, the facial expression setting function serves to set the facial expression of the agent 2 on the basis of the implicitness determination value. For example, as illustrated in FIG. 14A and FIG. 14B, the facial expression setting function serves to set the facial expression as if the agent 2 shows an anxious look. On the other hand, when the implicitness determination value is less than the second threshold, the facial expression of the agent 2 is set to the initial state and the routine then proceeds to step S210.

In step S210, the agent display function serves to display the agent 2 on the screen of the display 14 with the facial expression set in step S206 or step S209.

As described above, the process of the second embodiment include specifying the object 3 detected by the ambient detection sensor 11 as an explicit object and calculating any of a degree of proximity between the subject vehicle and the explicit object, a degree of possibility that the subject vehicle gets across a lane mark or road edge as the explicit object to deviate from the lane or road, and a degree of possibility that the subject vehicle violates a traffic rule represented by a traffic signal or speed sign as the explicit object, as an explicitness determination value. Then, when the explicitness determination value is the first threshold or more, the facial expression is set as if the agent 2 is surprised, as illustrated in FIG. 13A and FIG. 13B. This allows the driver to intuitively perceive that the subject vehicle and the explicit object may come close to each other, the subject vehicle may deviate from the lane or road, and the subject vehicle may violate the traffic rule, and can get the driver's attention.

Moreover, the process of the second embodiment include estimating the existence of an implicit object that is not detected by the ambient detection sensor 11 and calculating any of a degree of proximity between the subject vehicle and the implicit object (e.g. a pedestrian or a bicycle) and a degree of possibility that the subject vehicle gets across the implicit object (such as a lane mark or a road edge) to deviate from the lane or road, as an implicitness determination value. Then, when the implicitness determination value is the second threshold or more, the facial expression is set as if the agent 2 shows an anxious look, as illustrated in FIG. 14A and FIG. 14B. Through this operation, even when an object 3 is not detected by the ambient detection sensor 11, the driver can intuitively perceive that the subject vehicle and the implicit object may come close to each other and the subject vehicle will possibly deviate from the lane or road in the future. This can get the driver's attention.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described first embodiment, a configuration is exemplified in which the facial expression of the agent 2 is set as illustrated in FIG. 5A and FIG. 5B when the ambient detection sensor 11 detects an object 3, but in addition or alternatively, when an object 3 such as a pedestrian or a bicycle suddenly rushes out, the facial expression may be set as if the agent 2 is surprised as illustrated in FIG. 5A and FIG. 5B. The method of determining whether or not an object 3 such as a pedestrian or a bicycle suddenly rushes out is not particularly limited, and a determination can be made, for example, on the basis of the identification result of the object 3 and/or the speed of the object 3 approaching the subject vehicle.

In the above-described second embodiment, a configuration is exemplified in which, when the explicitness determination value is the first threshold or more, the facial expression is set as if the agent 2 is surprised as illustrated in FIG. 13A and FIG. 13B, but the present invention is not limited to this configuration. In an alternative configuration, for example, when the distance from the subject vehicle to the explicit object, the TTC, or the THW is a predetermined value or less, the facial expression may be set as if the agent 2 shows an anxious look as illustrated in FIG. 14A and FIG. 14B, while when a preceding vehicle suddenly decelerates, another vehicle suddenly cuts in, or a pedestrian or a bicycle suddenly rushes out, the facial expression may be set as if the agent 2 is surprised as illustrated in FIG. 13A and FIG. 13B.

In the above-described embodiments, a configuration is exemplified in which the agent 2 is displayed on the display 14 in a planar manner, but the present invention is not limited to this configuration. In an alternative configuration, for example, the agent 2 may be stereoscopically displayed using a 3D display or configured as a three-dimensional object. In addition or alternatively, the agent 2 may be configured as a robotic agent or other three-dimensional object or the like and the agent 2 itself may be used as a display device.

In the above-described embodiments, the ambient detection sensor 11 corresponds to the detector of the present invention, the display 14 corresponds to the display or display device of the present invention, and the control device 16 corresponds to the controller of the present invention.

DESCRIPTION OF REFERENCE NUMERALS

1 Automated driving apparatus
11 Ambient detection sensor
12 Vehicle speed sensor
13 Subject vehicle position detection device
14 Display
15 Drive control device
16 Control device
2 Agent
21 Eye
22 Pupil
3 Object

The invention claimed is:

1. A method of controlling a display device on which an image that imitates a face including at least an eye is displayed and which is mounted in a vehicle, the method comprising:
   using a detector, detecting an object around the vehicle to detect at least any one of a state of searching for the object, a state of detecting the object, a state of losing sight of the object, and a state of being incapable of detection of the object;
   determining a detection state of the detector on a basis of a detection result of the detector; and
   setting a display form of the eye on a basis of the determined detection state.

2. The method of controlling a display device according to claim 1, wherein
   the eye includes a pupil, and
   the pupil is arranged at a position at which a distance between the object and the pupil is shortest, in accordance with a position of the detected object.

3. The method of controlling a display device according to claim 1, comprising:
   specifying the object detected by the detector as an explicit object;
   calculating an explicitness determination value on a basis of at least any of a degree of proximity between a subject vehicle and the explicit object, a degree of possibility that the subject vehicle gets across the explicit object, and a degree of possibility that the subject vehicle violates a traffic rule represented by the explicit object; and setting a facial expression of the image imitating the face on a basis of the explicitness determination value.

4. The method of controlling a display device according to claim 3, wherein when the explicit object is a three-dimensional object on a road, the degree of proximity between the subject vehicle and the three-dimensional object is calculated as the explicitness determination value.

5. The method of controlling a display device according to claim 3, wherein when the explicit object is a lane mark on a road or a road edge, the degree of possibility that the subject vehicle gets across the lane mark or the road edge is calculated as the explicitness determination value.

6. The method of controlling a display device according to claim 3, wherein when the explicit object is a traffic signal, the degree of possibility that the subject vehicle violates the traffic rule is calculated as the explicitness determination value on a basis of a signal color of the traffic signal.

7. The method of controlling a display device according to claim 1, comprising:
estimating whether or not an implicit object that is not detected by the detector exists;
upon existence of the implicit object, calculating an implicitness determination value on a basis of at least any of a degree of proximity between a subject vehicle and the implicit object and a degree of possibility that the subject vehicle gets across the implicit object; and
setting a facial expression of the image imitating the face on a basis of the implicitness determination value.

8. The method of controlling a display device according to claim 1, wherein when automated driving travel control is performed for a subject vehicle, a facial expression of the image imitating the face is set on the basis of the detection state of the detector.

9. The method of controlling a display device according to claim 1, comprising:
setting the display form so as to blink the eye when the detection state is the state of searching for the object;
setting the display form so as to open the eye when the detection state is the state of detecting the object;
setting the display form of the eye so as to look around when the detection state is the state of losing sight of the object; and
setting the display form of closing the eye when the detection state is the state of being incapable of detection of the object.

10. A method of controlling a display device on which an image that imitates a face including at least an eye is displayed and which is mounted in a vehicle, the method comprising:
using a detector detecting an object around the vehicle to detect at least a state of detecting the object and a state of being incapable of detection of the object;
determining a detection state of the detector on a basis of a detection result of the detector;
setting a display form of opening the eye when the determined detection state is the state of detecting the object; and
setting a display form of closing the eye when the determined detection state is the state of being incapable of detection of the object.

11. A display device for a vehicle comprising:
a detector configured to detect an object around the vehicle;
a display configured to be mounted in the vehicle and configured to display an image imitating a face including at least an eye; and
a controller configured to display a detection state of the detector on the display using the image imitating the face as an intermediate,
the detector being further configured to detect any of a state of searching for the object, a state of detecting the object, a state of losing sight of the object, and a state of being incapable of detection of the object;
the controller being further configured to:
determine the detection state of the detector on a basis of a detection result of the detector; and
set a display form of the eye on a basis of the determined detection state.

12. A display device for a vehicle comprising:
a detector configured to detect an object around the vehicle;
a display configured to be mounted in the vehicle and configured to display an image imitating a face including at least an eye; and
a controller configured to display a detection state of the detector on the display using the image imitating the face as an intermediate,
the detector being further configured to detect at least a state of detecting the object and a state of being incapable of detection of the object;
the controller being further configured to:
determine the detection state of the detector on a basis of a detection result of the detector;
set a display form of opening the eye when the determined detection state is the state of detecting the object; and
set a display form of closing the eye when the determined detection state is the state of being incapable of detection of the object.

* * * * *